US012744241B2

(12) United States Patent
Kelchtermans et al.

(10) Patent No.: US 12,744,241 B2
(45) Date of Patent: Sep. 22, 2026

(54) ELECTROCHEMICAL CELL COMPRISING A POLYMER ELECTROLYTE AND A NICKEL BASED CATHODE ACTIVE MATERIAL

(71) Applicant: Umicore, Brussels (BE)

(72) Inventors: An-Sofie Kelchtermans, Hasselt (BE); Bjorn Joos, Hasselt (BE); An Hardy, Hasselt (BE); Marlies Van Bael, Hasselt (BE)

(73) Assignee: Umicore, Brussels (BE)

( * ) Notice: Subject to any disclaimer, the term of this patent is extended or adjusted under 35 U.S.C. 154(b) by 832 days.

(21) Appl. No.: 17/933,145

(22) Filed: Sep. 19, 2022

(65) Prior Publication Data

US 2024/0120534 A1 Apr. 11, 2024

(51) Int. Cl.

| | |
|---|---|
| ***H01M 10/0565*** | (2010.01) |
| ***H01M 4/36*** | (2006.01) |
| ***H01M 4/505*** | (2010.01) |
| ***H01M 4/525*** | (2010.01) |
| ***H01M 4/62*** | (2006.01) |
| ***H01M 10/058*** | (2010.01) |
| *H01M 4/02* | (2006.01) |

(52) U.S. Cl.

CPC ....... *H01M 10/0565* (2013.01); *H01M 4/366* (2013.01); *H01M 4/505* (2013.01); *H01M 4/525* (2013.01); *H01M 4/62* (2013.01); *H01M 10/058* (2013.01); *H01M 2004/028* (2013.01); *H01M 2220/20* (2013.01); *H01M 2220/30* (2013.01); *H01M 2300/0082* (2013.01)

(58) Field of Classification Search

CPC ............................................... H01M 2004/028

See application file for complete search history.

(56) References Cited

U.S. PATENT DOCUMENTS

| | | | | |
|---|---|---|---|---|
| 5,965,300 | A | 10/1999 | Lee et al. | |
| 2005/0008563 | A1* | 1/2005 | Naruoka | H01M 4/525 429/231.95 |
| 2009/0169976 | A1* | 7/2009 | Takahashi | H01M 10/0569 429/493 |
| 2020/0343586 | A1* | 10/2020 | Gerasopoulos | H01M 10/0525 |
| 2020/0411906 | A1 | 12/2020 | Gerasopoulos et al. | |
| 2021/0104772 | A1 | 4/2021 | Alvare | |
| 2022/0231333 | A1 | 7/2022 | He et al. | |

FOREIGN PATENT DOCUMENTS

| | | | |
|---|---|---|---|
| EP | 3168904 | A1 | 5/2017 |
| EP | 3691004 | A1 | 8/2020 |
| JP | H10283839 | A | 10/1998 |
| JP | 2017098241 | A | 6/2017 |
| JP | 2022535256 | A | 8/2022 |
| WO | 2019065471 | A1 | 4/2019 |
| WO | 2021011438 | A1 | 1/2021 |

OTHER PUBLICATIONS

Kelchtermans, An-Sofie, et al., “Polymeric backbone eutectogel hybrid solid-state electrolytes for high-voltage cathode materials in lithium-ion batteries”, E-MRS Fall 2021, Sep. 20-22, 2021, 19 pages.

Kelchtermans, An-Sofie, et al., “Polymeric backbone eutectogel hybrid solid-state electrolytes for lithium-ion batteries”, Mar. 28-30, 2022, 6 pages.

Zhang, Changkun, et al., “Polyeutectic-based stable and effective electrolytes for high-performance energy storage systems”, Energy & Environmental Science, Roayl Society of Chemistry, vol. 14, Jan. 12, 2021, 9 pages.

Joos, Bjorn, et al., “Polymeric Backbone Eutectogels as a New Generation of Hybrid Solid-State Electrolytes”, Chemistry of Materials, vol. 32, 2020, 11 pages.

Logan, Matthew W., et al., “UV-cured eutectic gel polymer electrolytes for safe and robust Li-ion batteries”, Journal of Materials Chemistry A, Roayl Society of Chemistry, vol. 8, Apr. 5, 2020, 11 pages.

Tomé, Liliana C., et al., “Emerging lonic Soft Materials Based on Deep Eutectic Solvents”, The Journal of Physical Chemistry B, vol. 124, Jul. 21, 2020, 14 pages.

Kelchtermans, An-Sofie, et al., “Insights in the interaction between cathode active materials and a new generation solid electrolyte”, Aug. 24-28, 2020, Electroceramics XVII, 3 pages.

Joos, Bjorn, “PhD Thesis: Toward green and sustainable lithium batteries, from novel electrolytes in LIBs to circular active materials in Li-S batteries”, PhD Defense, Jul. 13, 2020, 346 pages.

JPO: English Translation of Notice of Reasons for Rejection issued in corresponding Japanese Patent Application No. 2022-148647, mailed Jun. 2, 2026, 5 pages.

* cited by examiner

*Primary Examiner* — Jonathan Johnson

(74) *Attorney, Agent, or Firm* — Rimon P.C.; Allyn B. Elliott

(57) ABSTRACT

The present invention relates to an electrochemical cell comprising an anode, a polymer electrolyte and high-potential NMC type cathode active material. The polymer electrolyte comprises an electrolyte composition, preferably comprising a deep eutectic solvent (DES), and a polymer network having a polyacrylamide backbone.

16 Claims, 11 Drawing Sheets

ELECTROCHEMICAL CELL COMPRISING A POLYMER ELECTROLYTE AND A NICKEL BASED CATHODE ACTIVE MATERIAL

TECHNICAL FIELD AND BACKGROUND

The present invention relates to an electrochemical cell comprising a polymer electrolyte and cathode active material comprising Li, M and O, wherein M comprises Ni and one or both of Mn and Co. The polymer electrolyte comprises an electrolyte composition, preferably comprising a deep eutectic solvent (DES), and a polymer network having a polyacrylamide backbone.

Recently, there has been a rapid development of small and lightweight electronic products, electronic devices and communication devices. Similarly, there has been widespread adoption of electric vehicles which have emerged as an environmentally attractive transportation means. These factors have led to a demand for the improved performance of secondary batteries which are used as power sources in said products. Furthermore, lithium secondary batteries have come into the limelight as high-performing batteries due to their high energy density and high reference electrode potential.

Conventional lithium secondary batteries comprise liquid electrolytes such as organic solvents. A significant disadvantage of liquid electrolytes is that the compositions, in particular the solvents, are inflammable, which poses a large safety risk during normal operation and in particular in case of an incident. Another disadvantage is inherent to the liquid nature of the electrolyte, associated with risks of leakage and with increased risk of environmental pollution in case of a spill or leakage.

Recently, efforts have been made to develop solid electrolytes which allow the provision of a solid-state lithium-ion battery. Such solid-state batteries have significantly reduced EHS (environmental, health and safety) hazards. Conventional solid electrolytes may include oxide-based solid electrolytes, polymer-based solid electrolytes and sulfide-based electrolytes. Polymer-based electrolytes have been generally used due to their low flammability, good flexibility, excellent thermal stability and high safety.

The difficulty in developing solid electrolytes with high ionic conductivity, a broad electrochemical window, and mechanical/thermal stability, has led to the concept of solid composite electrolytes (SCE). These electrolytes comprise a liquid lithium-ion conducting electrolyte enclosed within a solid backbone or network. Examples include ionic liquids confined within an inorganic (e.g. silica) or a polymeric (e.g. poly(ethylene glycol) diacrylate (PEODA)) solid backbone.

A major challenge in the production of solid composite electrolytes, is the selection of a polymer backbone which is stable to sol-gel synthesis and can effectively encapsulate a liquid lithium-ion electrolyte. Moreover, it is difficult to develop solid composite electrolytes which are compatible with high-potential cathode materials, such as NMC622 or NMC811 and which exhibit satisfactory anodic stability. For example, the most common solid polymer electrolyte, PEO (polyethylene oxide), has an anodic stability that is limited to potentials around 4.0 V vs. $Li^+/Li$.

Energy Environ. Sci., 2021, 14, 931-939 contemplates the use of alkali metal bis(trifluoromethane)-sulfonimide (TFSI) salts in a polymer electrolyte comprising a N-isopropylacrylamide (NIPAM) polymer backbone.

Chem. Mater. 2020, 32, 3783-3793 contemplates the use of a lithium bis(trifluoromethane)-sulfonimide lithium salt (LiTFSI) and N-methylacetamide (MAc) based deep eutectic solvent in a polymer electrolyte comprising an ethylene glycol 4-acryloylmorpholine (AcMo) backbone.

US2020/0343586A1 contemplates the use of various deep eutectic solvents in polymer electrolytes comprising various polymeric backbones. A polymer electrolyte comprising a lithium bis(trifluoromethane)-sulfonimide lithium salt (LiTFSI) and N-methylacetamide (MAc) based deep eutectic solvent in a polymer network comprising an acrylate backbone is exemplified.

It is an object of the present invention to provide an electrochemical cell comprising a polymer electrolyte comprising a polymeric network which is compatible with deep eutectic solvents.

It is a further object of the present invention to provide an electrochemical cell comprising a polymer electrolyte which is compatible with high-voltage cathode active materials, in particular NMC622.

It is a further object of the present invention to provide an electrochemical cell comprising a polymer electrolyte which has high anodic stability.

It is a further object of the present invention to an electrochemical cell comprising a polymer electrolyte which has good mechanical flexibility.

SUMMARY OF THE INVENTION

The present inventors have found that polymer electrolytes comprising a polymer network based on specific (meth)acrylamide monomers effectively encapsulate deep eutectic solvents (DES) and are surprisingly compatible with electrode active materials comprising Li, M and O, wherein M comprises Ni and one or both of Mn and Co. As is shown in the appended examples, it was found that the polymer electrolytes described herein have excellent cycling stability when combined with a high potential electrode active material such as NMC622. Additionally, the inventors have found that the polymer electrolyte can conveniently be pre-synthesised but may also be synthesised in the presence of cathode active material, thereby providing a composite cathode material. One or more of the objects of the invention are achieved by the different aspects of the invention described herein.

Hence, in a first aspect of the present invention, there is provided an electrochemical cell comprising an anode, a cathode and a polymer electrolyte, wherein the cathode active material comprises Li, M, and O, wherein M comprises Ni in a content x, wherein 50.0 mol %$\leq$x$\leq$95.0 mol %, Mn in a content y, wherein 0.0 mol %$\leq$y$\leq$40.0 mol %, Co in a content z, wherein 0.0 mol %$\leq$z$\leq$40.0 mol %, D in a content a, wherein 0.0 mol %$\leq$a$\leq$2.0 mol %, wherein D is at least one element other than Li, Ni, Mn, Co, and O, wherein x+y+z+a is 100.0 mol %;

wherein the polymer electrolyte comprises an electrolyte composition and a polymer network, wherein the electrolyte composition preferably comprises a deep eutectic solvent (DES), wherein the polymer electrolyte is obtainable by polymerizing a precursor composition comprising the electrolyte composition and a first monomer according to formula (I)

(I)

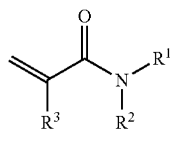

wherein $R^1$ represents a first substituent having from 1 to 8 carbon atoms and optionally comprising at least one functional group selected from alcohols, amines, ethers, ketones, amides, acetals, ketals, aminoacetals, hemiaminal ethers or combinations thereof, preferably wherein $R^1$ is selected from $C_1$-$C_6$ alkyl, $C_1$-$C_6$ hydroxyalkyl, $—(CH_2—CH_2—O)_n—H$;

and wherein $R^2$ represents H or a second substituent having from 1 to 8 carbon atoms and optionally comprising at least one functional group selected from alcohols, amines, ethers, ketones, amides, acetals, ketals, aminoacetals, hemiaminal ethers or combinations thereof, preferably wherein $R^2$ is selected from H, $C_1$-$C_6$ alkyl, $C_1$-$C_6$ hydroxyalkyl, $—(CH_2—CH_2—O)_n—H$;

wherein $R^3$ is selected from H, methyl or ethyl; and wherein n is an integer from 1 to 5.

The precursor composition typically further comprises a first crosslinker. Preferably, the first crosslinker is selected from crosslinkers comprising two or more functional groups selected from the group consisting of allyl ($—CH_3—CH{=}CH_2$), oxiranyl ($—C_2H_3O$), glycidyl ($—CH_2—C_2H_3O$), vinyl ether ($—O—CH{=}CH_2$), vinyl ester ($—C(O)—O—CH{=}CH_2$), vinyl amide ($—C(O)—NH—CH{=}CH_2$), vinyl amine ($—NH—CH{=}CH_2$), norbornene, maleate, fumarate, itaconate, alkynyl ($—C{\equiv}CH$), styrene ($-Ph-CH{=}CH_2$), acrylamide ($—NH—C(O)—CH{=}CH_2$), methacrylamide ($—NH—C(O)—C(CH_3){=}CH_2$), acrylate ($—O—C(O)—CH{=}CH_2$), methacrylate ($—O—C(O)—C(CH_3){=}CH_2$) and combinations thereof, preferably the first crosslinker is selected from crosslinkers comprising two or more functional groups selected from acrylamide ($—NH—C(O)—CH{=}CH_2$), methacrylamide ($—NH—C(O)—C(CH_3){=}CH_2$), acrylate ($—O—C(O)—CH{=}CH_2$), methacrylate ($—O—C(O)—C(CH_3){=}CH_2$) and combinations thereof.

In another aspect of the invention, there is provided a method for the production of an electrochemical cell comprising the steps of:

(a) providing a cathode, (b) providing an anode, (c) providing an electrolyte, (d) forming the electrochemical cell by assembling the cathode, the anode, and the polymer electrolyte into an electrochemical cell, wherein the cathode comprises cathode active material wherein the cathode active material comprises Li, M, and O, wherein M comprises Ni in a content x, wherein 50.0 mol %≤x≤95.0 mol %, Mn in a content y, wherein 0.0 mol %≤y≤40.0 mol %, Co in a content z, wherein 0.0 mol %≤z≤40.0 mol %, D in a content a, wherein 0.0 mol %≤a≤2.0 mol %, wherein D is at least one element other than Li, Ni, Mn, Co, and O, wherein x+y+z+a is 100.0 mol %;

wherein the electrolyte comprises a polymer electrolyte, and/or wherein the cathode is provided in the form of a composite cathode comprising the cathode active material and a polymer electrolyte;

wherein the polymer electrolyte comprised in the electrolyte and/or the composite cathode comprises an electrolyte composition and a polymer network, wherein the electrolyte composition preferably comprises a deep eutectic solvent (DES), wherein the polymer electrolyte is obtainable by polymerizing a precursor composition comprising the electrolyte composition and a first monomer according to formula (I)

(I)

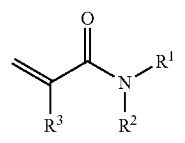

wherein $R^1$ represents a first substituent having from 1 to 8 carbon atoms and optionally comprising at least one functional group selected from alcohols, amines, ethers, ketones, amides, acetals, ketals, aminoacetals, hemiaminal ethers or combinations thereof, preferably wherein $R^1$ is selected from $C_1$-$C_6$ alkyl, $C_1$-$C_6$ hydroxyalkyl, $—(CH_2—CH_2—O)_n—H$;

and wherein $R^2$ represents H or a second substituent having from 1 to 8 carbon atoms and optionally comprising at least one functional group selected from alcohols, amines, ethers, ketones, amides, acetals, ketals, aminoacetals, hemiaminal ethers or combinations thereof, preferably wherein $R^2$ is selected from H, $C_1$-$C_6$ alkyl, $C_1$-$C_6$ hydroxyalkyl, $—(CH_2—CH_2—O)_n—H$;

wherein $R^3$ is selected from H, methyl or ethyl; and wherein n is an integer from 1 to 5.

In another aspect of the invention, there is provided a battery, more specifically a lithium-ion battery or a lithium metal battery comprising at least one electrochemical cell as described herein, for example two or more electrochemical cells according to the invention.

In another aspect of the invention, there is provided a method of making or operating cars, computers, personal digital assistants, mobile telephones, watches, camcorders, digital cameras, thermometers, calculators, laptop BIOS, communication equipment, remote car locks, and stationary applications such as energy storage devices for power plants by employing at least one battery or at least one electrochemical cell as described herein.

In another aspect of the invention, there is provided the use of the electrochemical cell of the invention in motor vehicles, bicycles operated by electric motor, robots, aircraft (for example unmanned aerial vehicles including drones), ships, satellites or stationary energy stores.

DETAILED DESCRIPTION OF THE INVENTION

Figure 1:
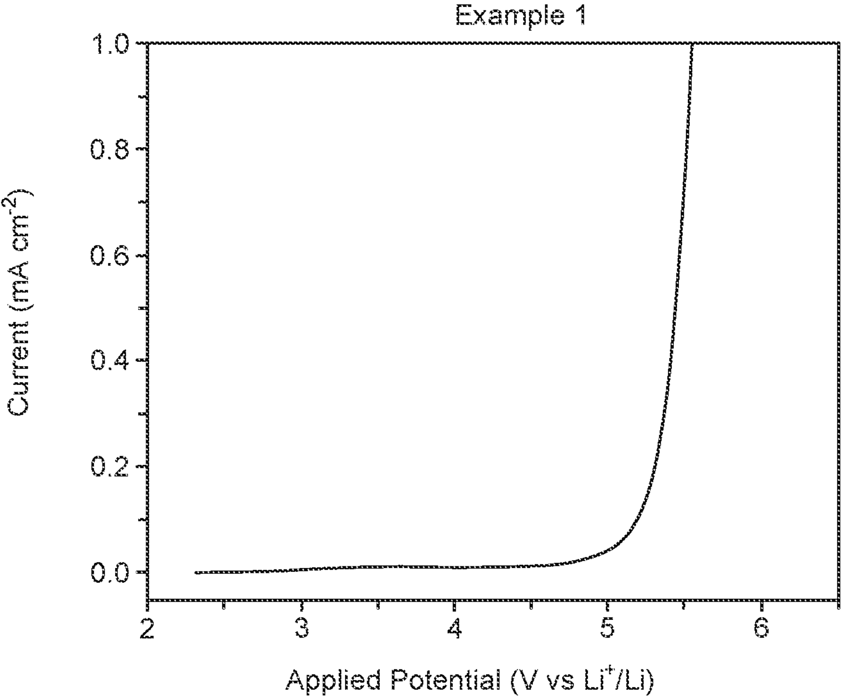
FIG. 1 shows the anodic linear sweep voltammetry performed on the polymer electrolyte of Example 1.
Figure 2:
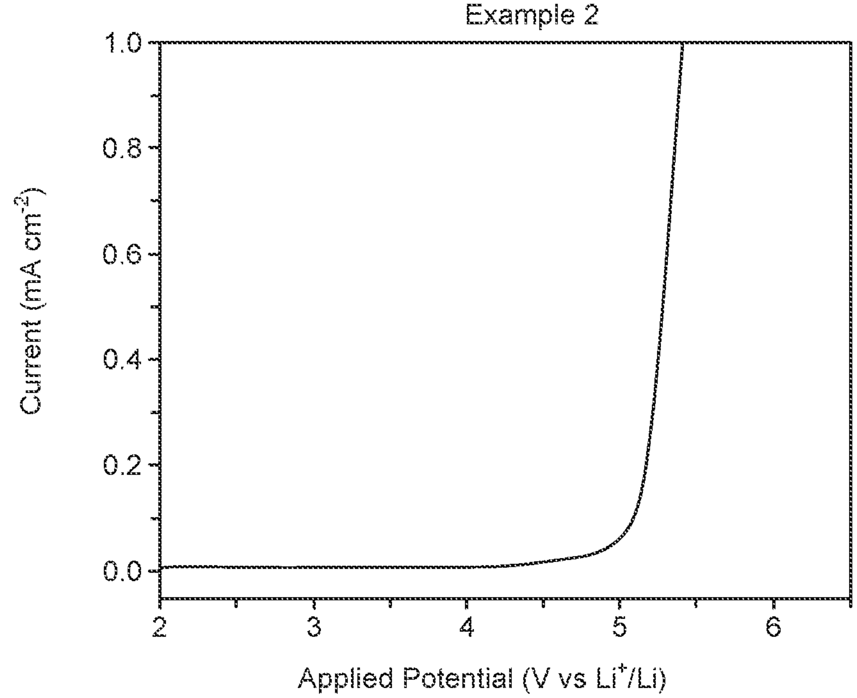
FIG. 2 shows the anodic linear sweep voltammetry performed on the polymer electrolyte of Example 2.
Figure 3:
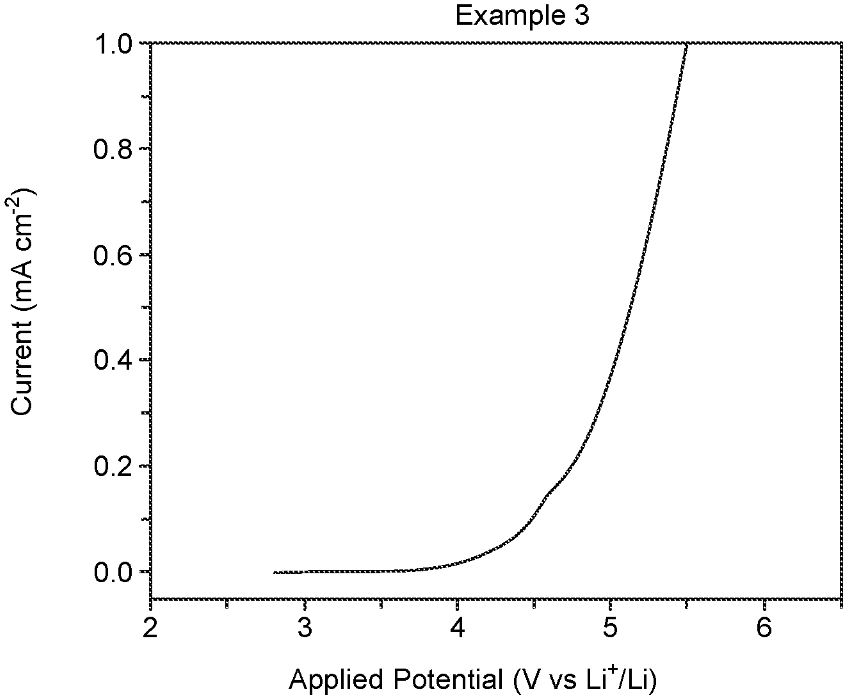
FIG. 3 shows the anodic linear sweep voltammetry performed on the polymer electrolyte of Example 3.
Figure 4:
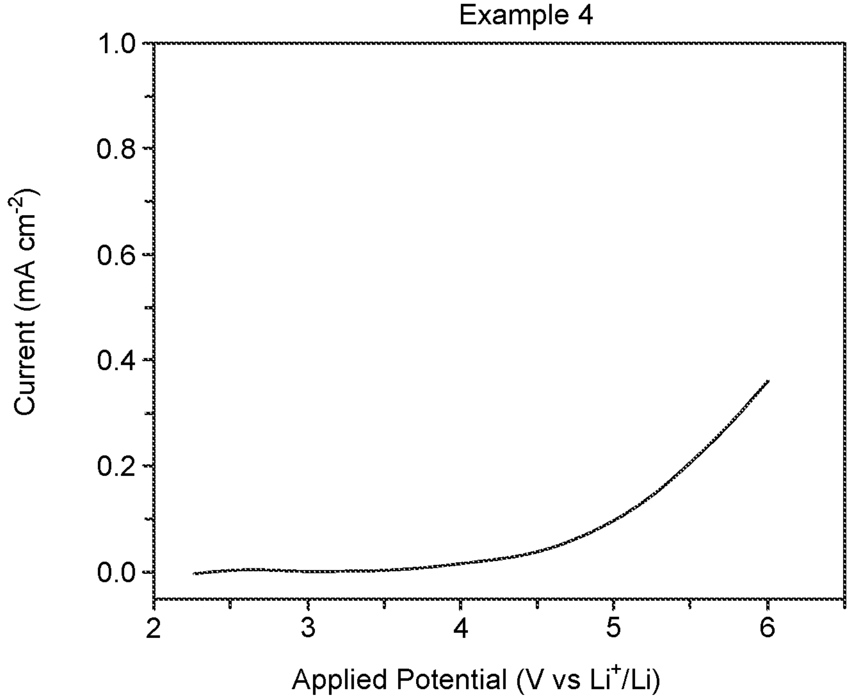
FIG. 4 shows the anodic linear sweep voltammetry performed on the polymer electrolyte of Example 4.
Figure 5:
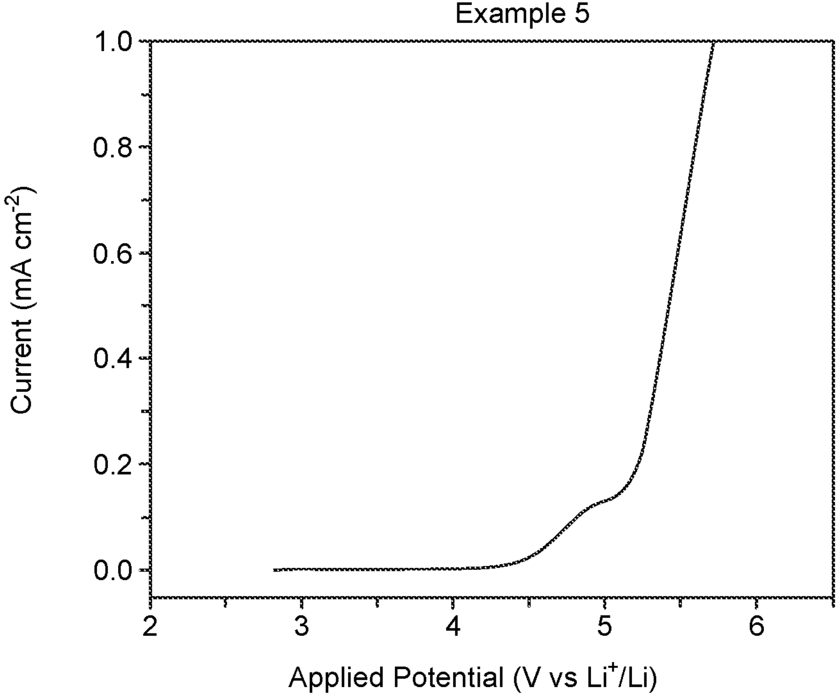
FIG. 5 shows the anodic linear sweep voltammetry performed on the polymer electrolyte of Comparative Example 5.
Figure 6:
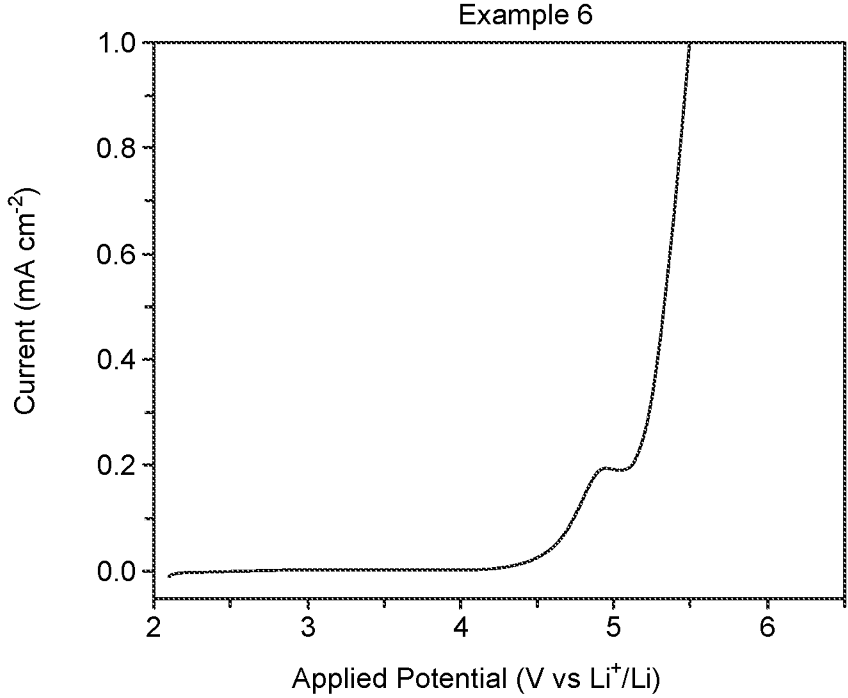
FIG. 6 shows the anodic linear sweep voltammetry performed on the polymer electrolyte of Comparative Example 6.
Figure 7:
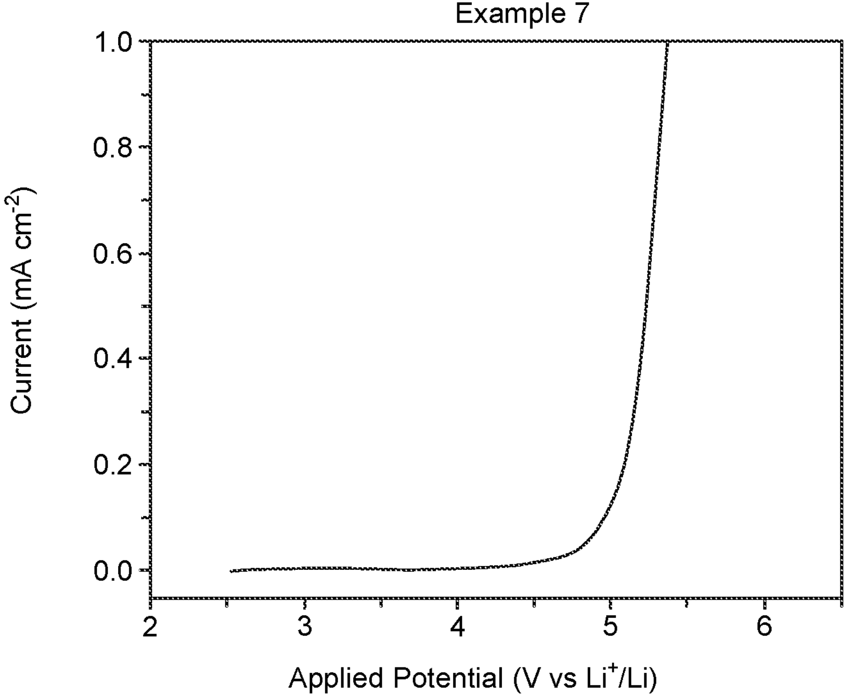
FIG. 7 shows the anodic linear sweep voltammetry performed on the polymer electrolyte of Example 7.
Figure 8:
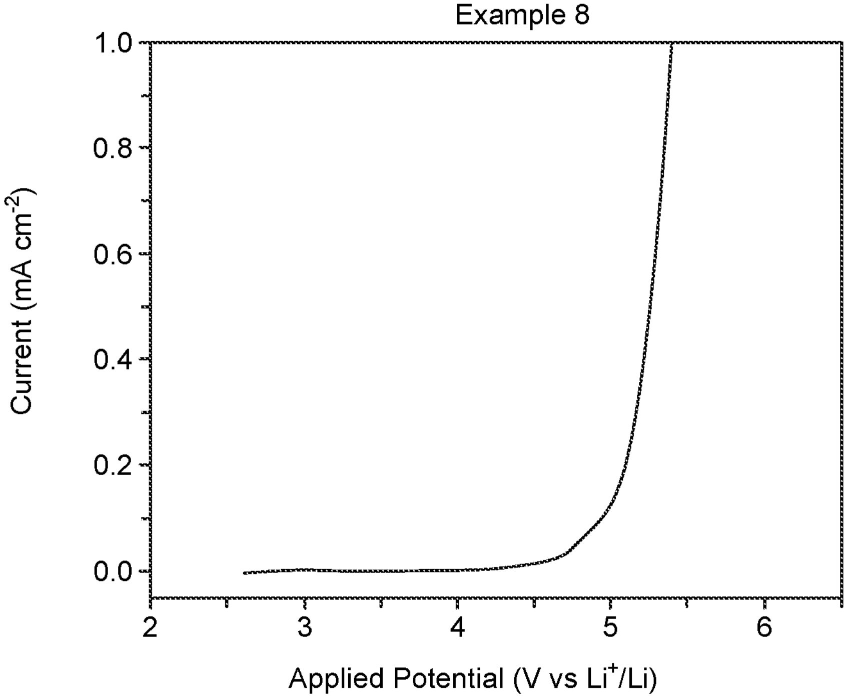
FIG. 8 shows the anodic linear sweep voltammetry performed on the polymer electrolyte of Example 8.
Figure 9:
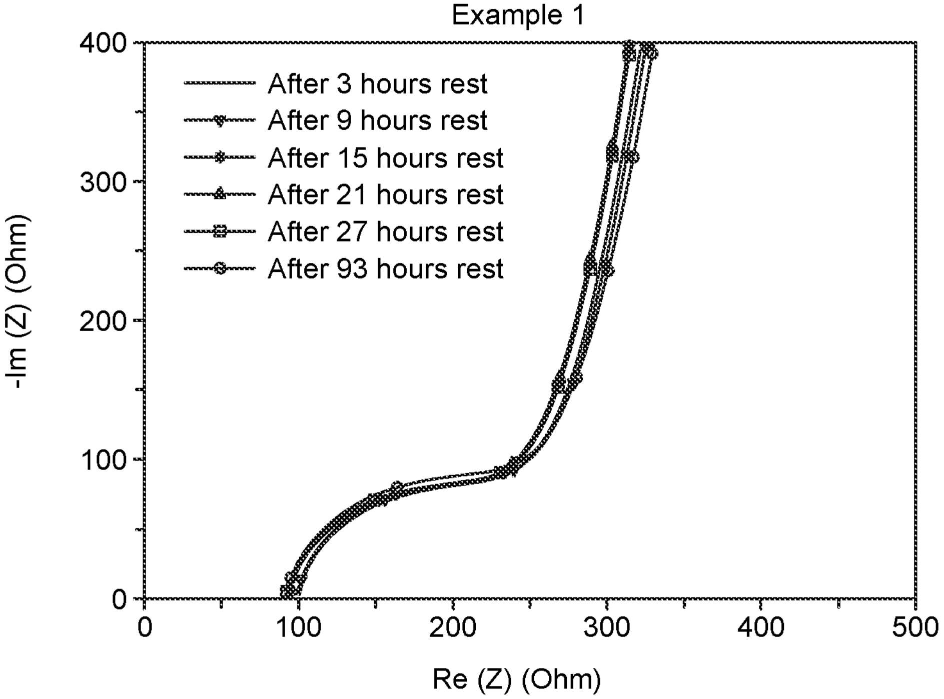
FIG. 9 shows the EIS characterisation of symmetric cells comprising NMC622 electrodes and the polymer electrolyte of Example 1 (impendence after every 6 hours of rest).
Figure 10:
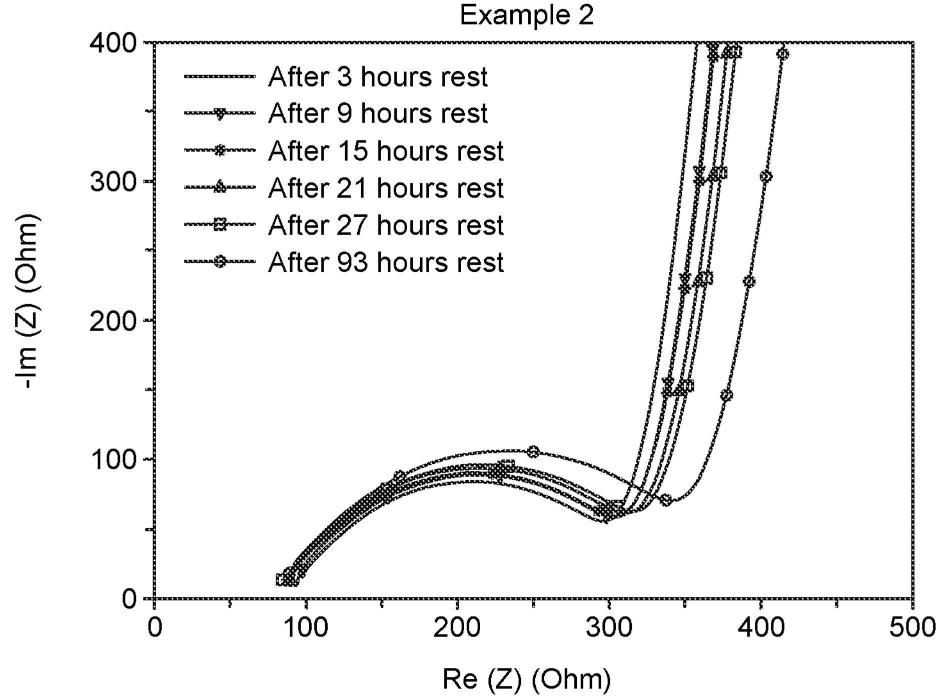
FIG. 10 shows the EIS characterisation of symmetric cells comprising NMC622 electrodes and the polymer electrolyte of Example 2 (impendence after every 6 hours of rest).
Figure 11:
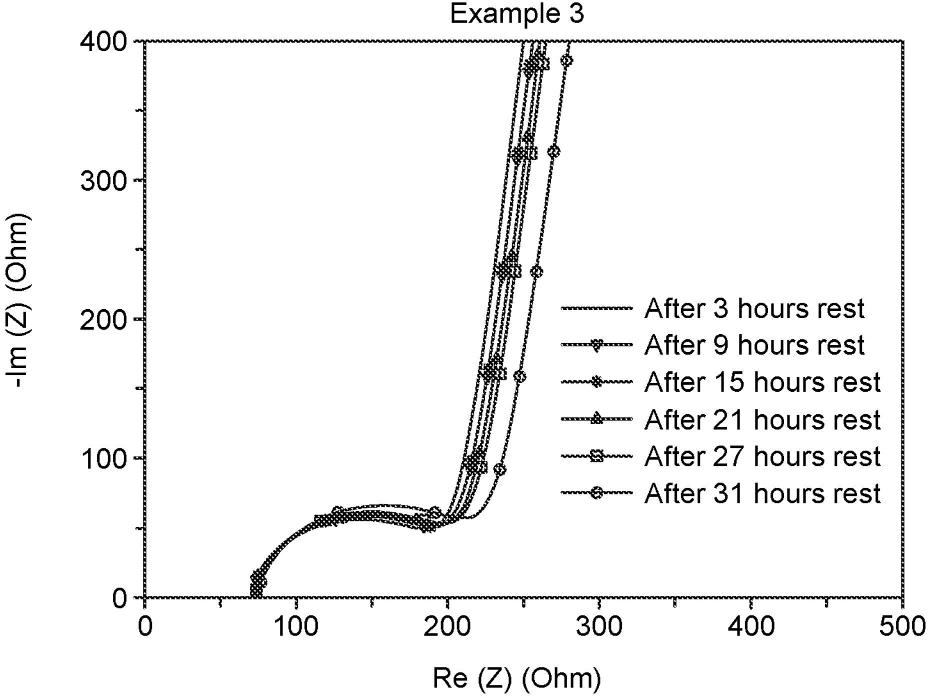
FIG. 11 shows the EIS characterisation of symmetric cells comprising NMC622 electrodes and the polymer electrolyte of Example 3 (impendence after every 6 hours of rest).
Figure 12:
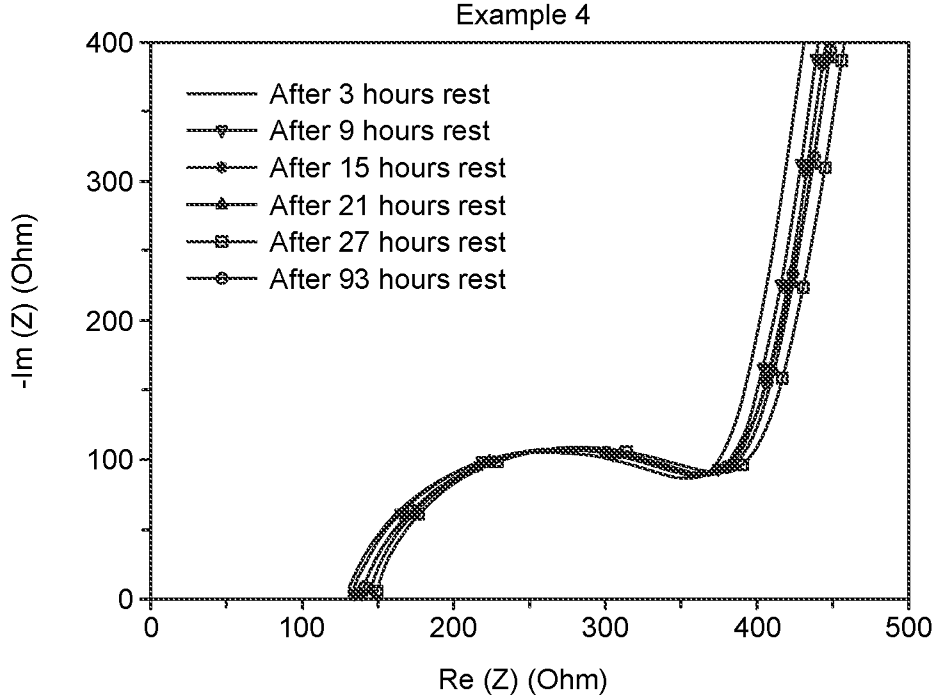
FIG. 12 shows the EIS characterisation of symmetric cells comprising NMC622 electrodes and the polymer electrolyte of Example 4 (impendence after every 6 hours of rest).
Figure 13:
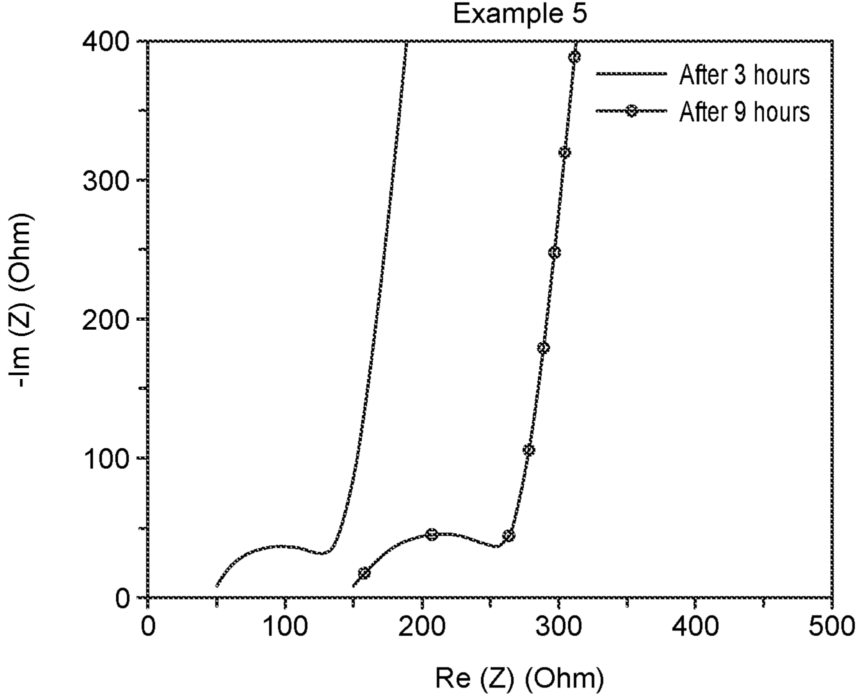
FIG. 13 shows the EIS characterisation of symmetric cells comprising NMC622 electrodes and the polymer electrolyte of Comparative Example 5 (impendence after every 6 hours of rest).
Figure 14:
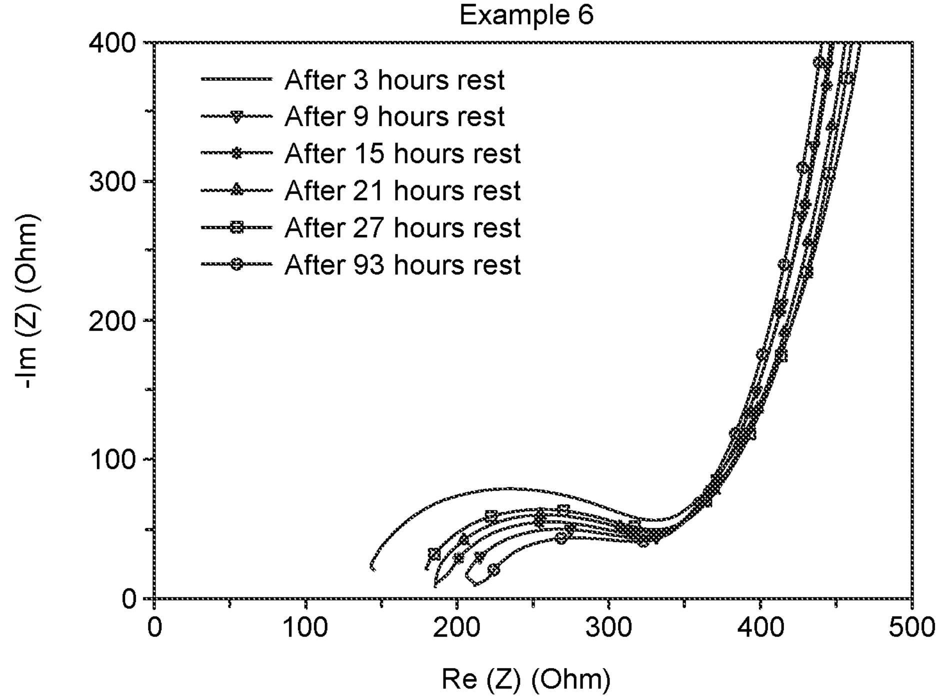
FIG. 14 shows the EIS characterisation of symmetric cells comprising NMC622 electrodes and the polymer electrolyte of Comparative Example 6 (impendence after every 6 hours of rest).
Figure 15:
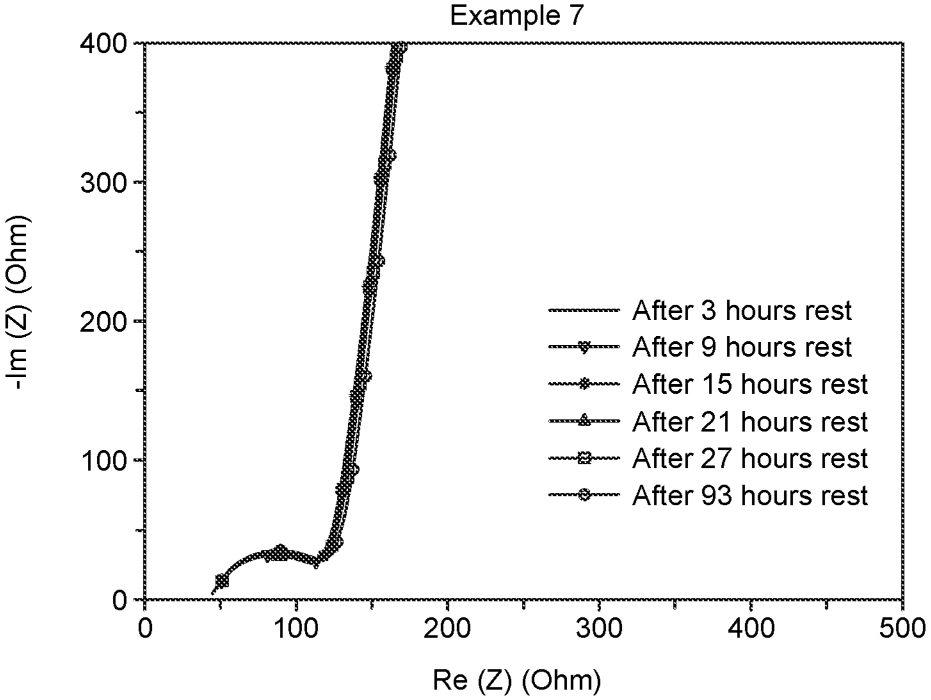
FIG. 15 shows the EIS characterisation of symmetric cells comprising NMC622 electrodes and the polymer electrolyte of Example 7 (impendence after every 6 hours of rest).
Figure 16:
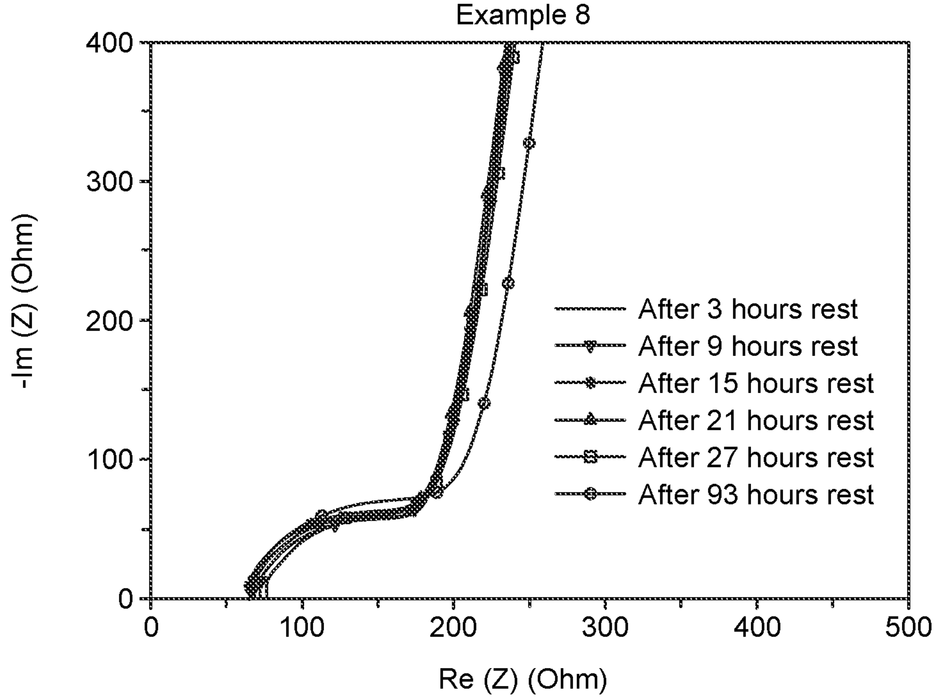
FIG. 16 shows the EIS characterisation of symmetric cells comprising NMC622 electrodes and the polymer electrolyte of Example 8 (impendence after every 6 hours of rest).
Figure 17:
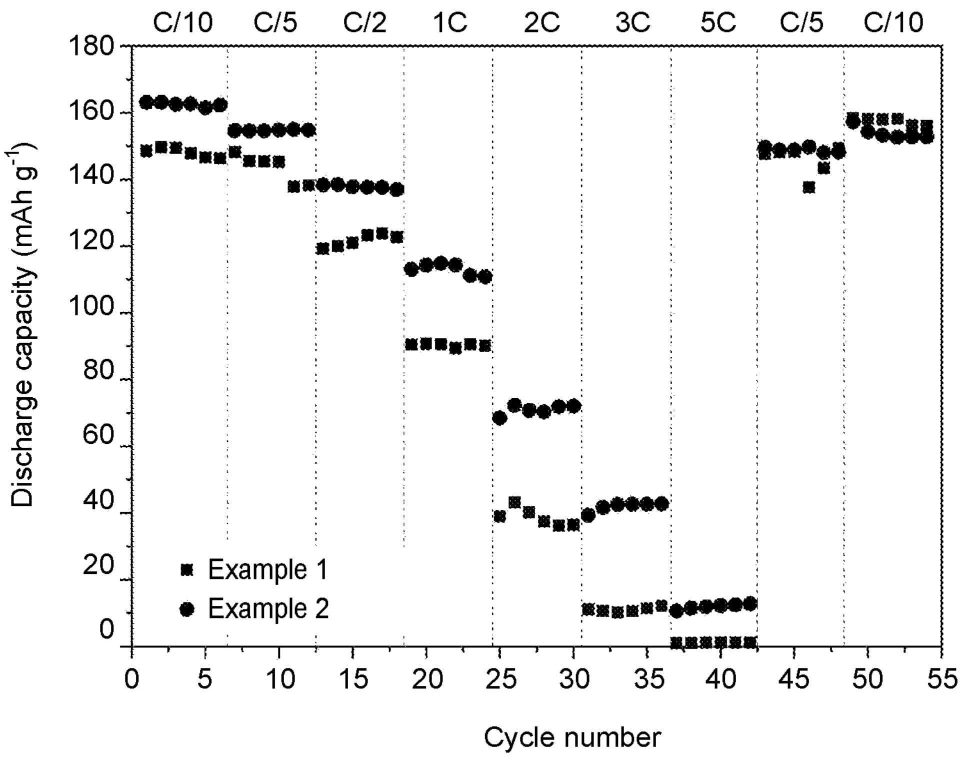
FIG. 17 shows the cycling capacity of cells comprising NMC622 and Li electrodes with Example 1 and 2 electrolytes. The discharge capacities are a mean of three cells for each C-rate. The capacities are normalized to the mass of active material in the positive electrode.
Figure 18:
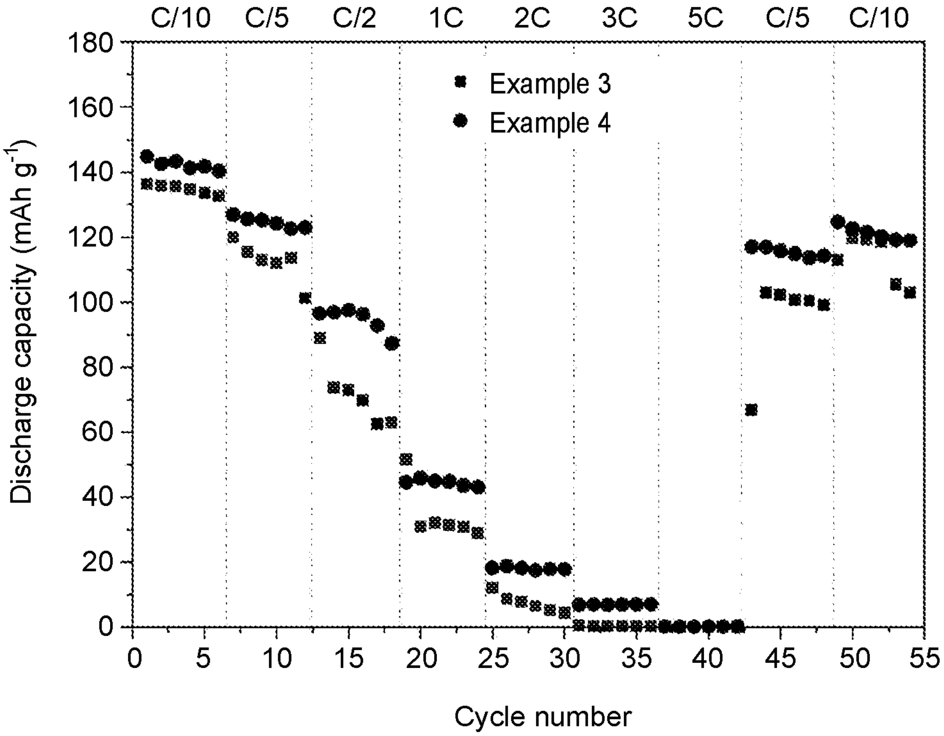
FIG. 18 shows the cycling capacity of cells comprising NMC622 and Li electrodes with Example 3 and 4 electrolytes. The discharge capacities are a mean of three cells for each C-rate. The capacities are normalized to the mass of active material in the positive electrode.
Figure 19:
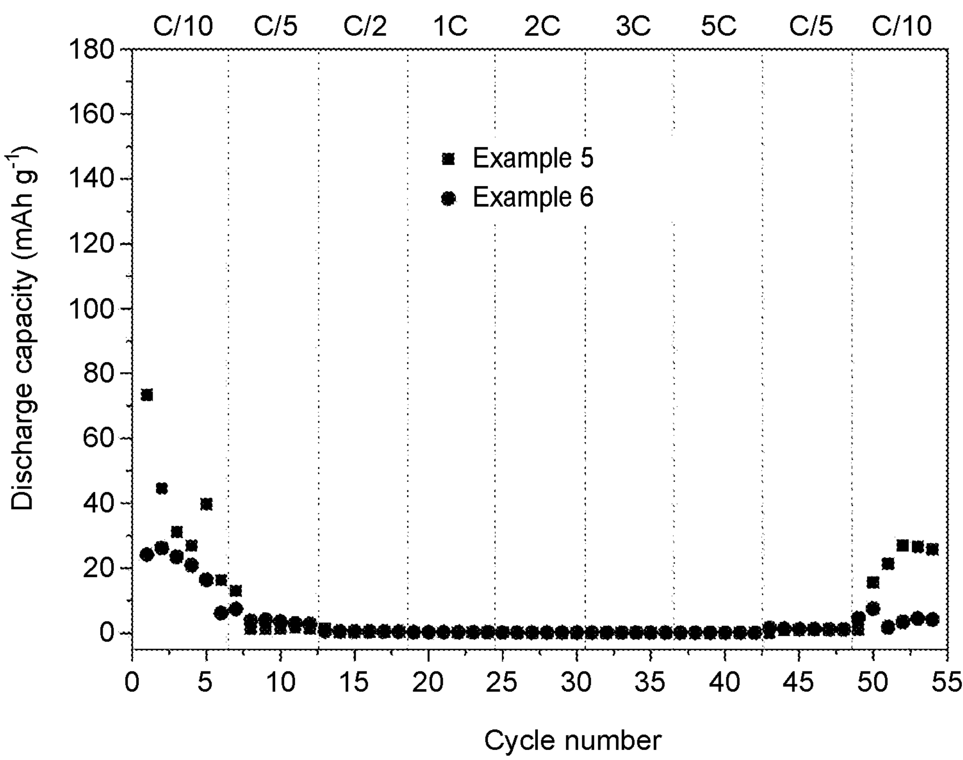
FIG. 19 shows the cycling capacity of cells comprising NMC622 and Li electrodes with Comparative Example 5 and 6 electrolytes. The discharge capacities are a mean of three cells for each C-rate. The capacities are normalized to the mass of active material in the positive electrode.
Figure 20:
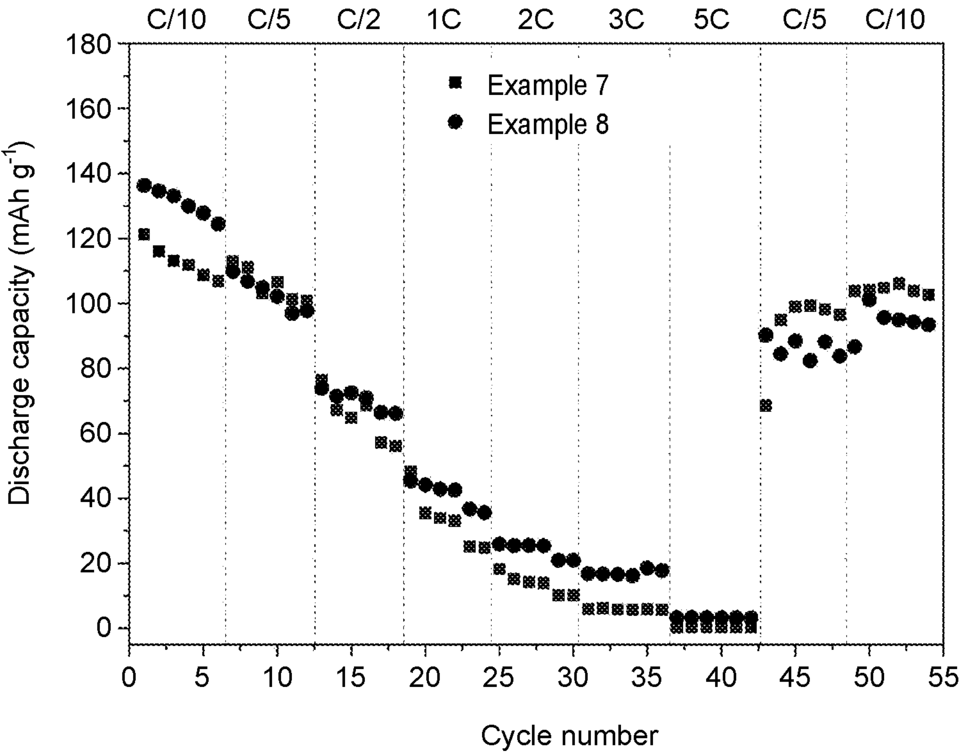
FIG. 20 shows the cycling capacity of cells comprising NMC622 and Li electrodes with Example 7 and 8 electrolytes. The discharge capacities are a mean of three cells for each C-rate. The capacities are normalized to the mass of active material in the positive electrode.

In the following detailed description, preferred embodiments are described in detail to enable the practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

The expression "comprise" and variations thereof, such as, "comprises" and "comprising" as used herein should be construed in an open, inclusive sense, meaning that the embodiment described includes the recited features, but that it does not exclude the presence of other features, as long as they do not render the embodiment unworkable.

The expressions "one embodiment", "a particular embodiment", "an embodiment" etc. as used herein should be construed to mean that a particular feature, structure or characteristic described in connection with the embodiment is included in at least one embodiment. Thus, the appearances of such expressions in various places throughout this specification do not necessarily all refer to the same embodiment. Furthermore, the particular features, structures, or characteristics may be combined in any suitable manner in one or more embodiments. For example, certain features of the disclosure which are described herein in the context of separate embodiments are also explicitly envisaged in combination in a single embodiment.

The singular forms "a," "an," and "the" as used herein should be construed to include plural referents unless the content clearly dictates otherwise. It should also be noted that the term "or" is generally employed in its broadest sense, that is as meaning "and/or" unless the content clearly dictates otherwise.

The expression "cathode active material" as used herein is also interchangeably referred to as "positive electrode active material". As will be understood by the skilled person, the cathode polarity can be positive or negative depending on the mode of operation of an electrochemical cell comprising the cathode active material. The term "a cathode active material" or "a positive electrode active material" as used herein is defined as a material which is electrochemically active in a positive electrode or a cathode. By active material, it must be understood to be a material capable to capture and release Li ions when subjected to a voltage change over a predetermined period of time.

The expression "(meth)acrylamide" as used herein should be interpreted as "methacrylamide, acrylamide or combinations thereof". For example, N-dialkyl (meth)acrylamide should be interpreted as "N-dialkyl methacrylamide, N-dialkyl acrylamide, or combinations thereof".

In the context of the present disclosure, when it is noted that a substituent (optionally) comprises a certain number of functional groups (e.g. one or two) functional groups, this should be construed as meaning that the substituent has exactly the recited number of functional groups. For example, the expression "selected from $C_1$-$C_6$ hydroxyalkyl, wherein the $C_1$-$C_6$ hydroxyalkyl comprises one hydroxyl functional group" should be construed as meaning that there is exactly one (1) hydroxyl functional group present.

The parameters x, y, z and a as referred to herein in the context of the composition of cathode active material, are measured by Inductively coupled plasma optical emission spectrometry (ICP-OES).

The ionic conductivity as referred to herein, refers to the ionic conductivity determined by electrochemical impedance spectroscopy (EIS) (using a Biologic SP-300) of the polymer electrolyte in a symmetric stainless steel|electrolyte|stainless steel Swagelok-type cell at the specified temperature by perturbing the open-circuit potential with an AC sinusoidal potential of 10 mV amplitude over a frequency range of 10 kHz-100 mHz.

The "anodic stability limit" as referred to herein is determined by linear sweep voltammetry (preferably using a Bio-Logic, SP-300) of the polymer electrolyte which was sandwiched between a stainless-steel working electrode and a lithium metal reference and counter electrode in a coin cell setup wherein the voltage at the working electrode was swept from the open circuit potential to 6 V vs $Li^+/Li$ in the anodic scan, with a scan rate of 10 mV $s^{-1}$. The stability limit was determined as the onset of electrolyte oxidation, which can be observed by a sudden increase in the measured current.

The Electrochemical Cell of the Invention

In a first aspect of the present invention, there is provided an electrochemical cell comprising an anode, a cathode and a polymer electrolyte, wherein the cathode active material comprises Li, M, and O, wherein M comprises Ni in a content x, wherein 50.0 mol %≤x≤95.0 mol %, Mn in a content y, wherein 0.0 mol %≤y≤40.0 mol %, Co in a content z, wherein 0.0 mol %≤z≤40.0 mol %, D in a content a, wherein 0.0 mol %≤a≤2.0 mol %, wherein D is at least one element other than Li, Ni, Mn, Co, and O, wherein x+y+z+a is 100.0 mol %;

wherein the polymer electrolyte comprises an electrolyte composition and a polymer network, wherein the electrolyte composition preferably comprises a deep eutectic solvent (DES), wherein the polymer electrolyte is obtainable by polymerizing a precursor composition comprising the electrolyte composition and a first monomer according to formula (I)

(I)

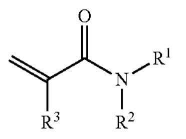

wherein $R^1$ represents a first substituent having from 1 to 8 carbon atoms and optionally comprising at least one functional group selected from alcohols, amines, ethers, ketones, amides, acetals, ketals, aminoacetals, hemiaminal ethers or combinations thereof, preferably wherein $R^1$ is selected from $C_1$-$C_6$ alkyl, $C_1$-$C_6$ hydroxyalkyl, $—(CH_2—CH_2—O)_n—H$;

and wherein $R^2$ represents H or a second substituent having from 1 to 8 carbon atoms and optionally comprising at least one functional group selected from alcohols, amines, ethers, ketones, amides, acetals, ketals, aminoacetals, hemiaminal ethers or combinations thereof, preferably wherein $R^2$ is selected from H, $C_1$-$C_6$ alkyl, $C_1$-$C_6$ hydroxyalkyl, $—(CH_2—CH_2—O)_n—H$;

wherein $R^3$ is selected from H, methyl or ethyl; and wherein n is an integer from 1 to 5.

In accordance with highly preferred embodiments of the invention, the anode has a different composition than the cathode. While symmetrical cells are sometimes used for testing purposes, the skilled person will understand that in order to obtain a functional electrochemical cell, the anode needs to be different from the cathode.

The anode comprises anode active material. Suitable electrochemically active anode materials are those known in the art. For example, the anode may comprise graphitic carbon, metallic lithium or a metal alloy comprising lithium as the anode active material.

In preferred embodiments of the invention, the electrochemical cell of the invention comprises the polymer electrolyte placed in contact with the cathode.

For example, the electrochemical cell of the invention may comprise the polymer electrolyte placed between and in contact with the anode and the cathode.

For example, the electrochemical cell of the invention may also comprise the polymer electrolyte in the form of a coating on the anode and/or the cathode.

For example, the electrochemical cell of the invention may comprise the polymer electrolyte and cathode active material in the form of a composite cathode. In such embodiments, the electrochemical cell preferably comprises a further electrolyte placed between the composite cathode and the anode, which further electrolyte may be the same polymer electrolyte used in the composite cathode, or another electrolyte.

The composite cathode may comprise a homogenous mixture of cathode active material particles and polymer electrolyte particles. The homogenous mixture may comprise further ingredients.

In some embodiments of the invention, the composite cathode described herein is provided with the provision that the monomer according to formula (I) is not N,N-dimethylacrylamide.

Alternatively, the composite cathode may comprise the polymer electrolyte coated on and/or at least partially embedded in the cathode active material. Such composite cathodes are obtainable by contacting the precursor composition with cathode active material, and polymerizing the precursor composition in the presence of the cathode active material. The contacting preferably comprises mixing the precursor composition with preferably particulate cathode active material, or depositing precursor composition on a surface of porous cathode active material. The contacting preferably takes place for at least 1 minute before polymerisation, such that a thorough mixing or impregnation may be achieved. In this way, a composite cathode comprising the polymer electrolyte and the cathode active material can be obtained. The precursor composition preferably comprises one or more radical initiators as described herein elsewhere, and polymerizing the precursor composition preferably comprises activating the radical initiator. The activation is preferably performed by UV irradiation of the precursor composition or by heating the precursor composition to a temperature of at least 50° C., preferably at least 60° C. It is preferred that the polymerization is performed under an inert gas atmosphere, preferably an inert atmosphere, such as nitrogen or argon.

Electrochemical cells as described herein are preferably lithium-ion-containing cells wherein the charge transport is effected by Li' ions. The electrochemical cell may have a disc-like or prismatic shape. The electrochemical cells can include a housing that can be made from steel or aluminium.

A plurality of electrochemical cells may be combined into an all solid-state battery, which has both solid electrodes and solid electrolytes.

The polymer network referred to in the present disclosure is a three-dimensional network, obtainable by polymerisation of one or more monomers according to formula (I) in the presence of a crosslinker. Such three-dimensional polymer networks are also referred to as gels, such that the polymer electrolytes described in the context of the present invention may also be referred to as "gel polymer electrolytes". For the purposes of the present disclosure, a gel polymer refers to a polymer network (i.e. a three-dimensional cross-linked system) which exhibits no flow when in the steady-state, but allows for diffusion of a liquid phase through the polymer network. Preferably, the gel is self-standing. Such gels typically exhibit a combination of flexibility, mechanical robustness, low vapour pressure and preferably nonflammability.

As the skilled person will understand on the basis of the present disclosure, the electrolyte composition is comprised in the polymer network. The electrolyte composition is typically confined in the polymer network, meaning that substantially no electrolyte composition spontaneously flows from the polymer electrolyte of the invention when it is placed on a surface (such as a ceramic lab bench) without application of external pressure. In all aspects of the invention, it is highly preferred that the electrolyte composition, in the absence of the polymer network, is liquid at 20° C.

In preferred embodiments of the invention, the electrochemical cell of the invention is provided wherein the first monomer is selected from compounds according to formula (I)

- wherein $R^1$ represents a first substituent having from 1 to 6 carbon atoms and optionally comprising one or two functional groups selected from alcohols, amines, ethers, ketones, amides, acetals, ketals, aminoacetals, hemiaminal ethers or combinations thereof;
- wherein $R^2$ represents H or a second substituent having from 1 to 6 carbon atoms and optionally comprising one or two functional groups selected from alcohols, amines, ethers, ketones, amides, acetals, ketals, aminoacetals, hemiaminal ethers or combinations thereof, preferably wherein $R^2$ is selected from H, $C_1$-$C_6$ alkyl, $C_1$-$C_6$ hydroxyalkyl, $—(CH_2—CH_2—O)_n—H$;
- wherein $R^3$ is selected from H, methyl or ethyl; and
- wherein n is an integer from 1 to 5.

In more preferred embodiments of the invention, the electrochemical cell of the invention is provided wherein the first monomer is selected from compounds according to formula (I)

- wherein $R^1$ represents a first substituent having from 1 to 6 carbon atoms and optionally comprising one or two functional groups selected from alcohols;
- wherein $R^2$ represents H or a second substituent having from 1 to 6 carbon atoms and optionally comprising one or two functional groups selected from alcohols, preferably wherein $R^2$ is selected from H, $C_1$-$C_6$ alkyl, $C_1$-$C_6$ hydroxyalkyl, wherein the $C_1$-$C_6$ hydroxyalkyl comprises one hydroxyl functional group;
- wherein $R^3$ is selected from H, methyl or ethyl; and
- wherein n is an integer from 1 to 5.

In highly preferred embodiments of the invention, the electrochemical cell is provided wherein the first monomer is according to option A, B, or C:

A. $R^1$ is selected from $C_1$-$C_6$ alkyl, preferably $R^1$ is a $C_3$ alkyl, and $R^2$ is selected from H or methyl, preferably $R^2$ is H, and $R^3$ is selected from H or methyl, preferably $R^3$ is H; or B. $R^1$ is selected from $C_1$-$C_6$ alkyl, preferably $R^1$ is a $C_2$ alkyl, and $R^2$ is selected from selected from $C_1$-$C_6$ alkyl, preferably $R^2$ is a $C_2$ alkyl, and $R^3$ is selected from H or methyl, preferably $R^3$ is H; or C. $R^1$ is selected from $C_1$-$C_6$ hydroxyalkyl, wherein the $C_1$-$C_6$ hydroxyalkyl comprises one hydroxyl functional group, preferably $R^1$ is 2-hydroxyethyl, $R^2$ is selected from H or methyl, preferably $R^2$ is H, and $R^3$ is selected from H or methyl, preferably $R^3$ is H.

In some embodiments of the invention, the electrochemical cell is provided wherein the first monomer is according to option B, with the provision that the first monomer is not N,N-dimethylacrylamide.

In preferred embodiments of the invention, the electrochemical cell is provided wherein the first monomer according to formula (I) is selected from the group consisting of N-isopropylamide (NIPAM), N,N-diethylacrylamide (DEAA), N-(2-hydroxyethyl)acrylamide (HEAA), and combinations thereof.

In preferred embodiments of the invention, the first monomer constitutes at least 80 mol % of all monomers in the precursor composition, preferably at least 90 mol %, more preferably at least 95 mol %. In highly preferred embodiments of the invention, the first monomer comprises at least 98 mol %, 99 mol % or about 100 mol % of all monomers in the composition. For the purposes of determining the total amount of monomers in the precursor composition, any compound which is polymerizable with the first monomer and has a functionality of 1 is considered a monomer, wherein the functionality is determined on the basis of functional groups which are free-radical polymerizable with the acrylamide functionality of the first monomer.

In preferred embodiments of the invention, the first monomer constitutes at least 80 mol % of all monomers in the precursor composition of the polymer network of the electrochemical cell, preferably at least 90 mol %, more preferably at least 95 mol %. In highly preferred embodiments of the invention, the first monomer comprises at least 98 mol %, 99 mol % or about 100 mol % of all monomers in the composition. For the purposes of determining the total amount of monomers in the precursor composition, any compound which is polymerizable with the first monomer and has a functionality of 1 is considered a monomer, wherein the functionality is determined on the basis of functional groups which are free-radical polymerizable with the acrylamide functionality of the first monomer.

Crosslinkers

In accordance with preferred embodiments of the invention, the precursor composition further comprises a first crosslinker. Since the first monomer (which is a (meth) acrylamide according to formula (I)) is monofunctional, the inclusion of a crosslinker in the precursor composition allows a three-dimensional polymer network to be formed. The crosslinker may be chosen from any compound which is polymerizable with the first monomer and which has a functionality of 2 or more, wherein the functionality is determined on the basis of functional groups which are free-radical polymerizable with the acrylamide functionality of the first monomer.

It is preferred that the first crosslinker is selected from crosslinkers comprising two or more functional groups selected from the group consisting of allyl ($—CH_3—CH{=}CH_2$), oxiranyl ($—C_2H_3O$), glycidyl ($—CH_2—$ $C_2H_3O$), vinyl ether (—O—CH═$CH_2$), vinyl ester (—C(O)—O—CH═$CH_2$), vinyl amide (—C(O)—NH—CH═$CH_2$), vinyl amine (—NH—CH═$CH_2$), norbornene, maleate, fumarate, itaconate, alkynyl (—C≡CH), styrene (-Ph-CH═$CH_2$), acrylamide (—NH—C(O)—CH═$CH_2$), methacrylamide (—NH—C(O)—C($CH_3$)═$CH_2$), acrylate (—O—C(O)—CH═$CH_2$), methacrylate (—O—C(O)—C($CH_3$)═$CH_2$) and combinations thereof, preferably the first crosslinker is selected from crosslinkers comprising two or more functional groups selected from acrylamide (—NH—C(O)—CH═$CH_2$), methacrylamide (—NH—C(O)—C($CH_3$)═$CH_2$), acrylate (—O—C(O)—CH═$CH_2$), methacrylate (—O—C(O)—C($CH_3$)═$CH_2$) and combinations thereof. In some embodiments of the invention, the first crosslinker comprises two, three or four functional groups selected from the functional groups described in the preceding sentence, however, it is preferred that the first crosslinker comprises two of the same or different functional groups selected from the functional groups described in the preceding sentence.

Examples of suitable and thus preferred embodiments of the first crosslinker, are those wherein the first crosslinker is selected from allyl methacrylate, allyl acrylate, glycidyl methacrylate, ethylene glycol dicyclopentyl ether methacrylate, ethylene glycol dicyclopentyl ether acrylate, triethylene glycol divinyl ether, poly(ethylene glycol) diacrylamide, poly(ethylene glycol) dimethacrylate, poly(ethylene glycol) diacrylate, ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate, tetraethylene glycol diacrylate, propanediol dimethacrylate, propanediol diacrylate, 1,4-butanediol dimethacrylate, 1,4-butanediol diacrylate, 1,5-pentanediol dimethacrylate, 1,5-pentanediol diacrylate, 1,6-hexanediol dimethacrylate, 1,6-hexanediol diacrylate, 1,10-bis(acryloyloxy)decane, 1,12-dodecanediol dimethacrylate, 1,12-dodecanediol diacrylate, poly(silicone-alt-PEG) dimethacrylate, poly(silicone-alt-PEG) diacrylate, poly(propylene glycol) dimethacrylate, poly(propylene glycol) diacrylate, bisphenol A propoxylate dimethacrylate, bisphenol A propoxylate diacrylate, neopentylglycol propoxylate dimethacrylate, neopentylglycol propoxylate diacrylate, glycerol ethoxylate-co-propoxylate dimethacrylate, glycerol ethoxylate-co-propoxylate diacrylate, propylene glycol dimethacrylate, propylene glycol diacrylate, polycaprolactone dimethacrylate, polycaprolactone diacrylate, pentaerythritol propoxylate dimethacrylate, pentaerythritol propoxylate diacrylate, tri(propylene glycol) dimethacrylate, tri(propylene glycol) diacrylate, diurethane dimethacrylate (DUDMA), 1,3,5-triallyl-2,4,6(1H,3H,5H)-trione, 2,4,6,-triallyloxy-1,3,5,triazine, trimethylolpropane propoxylate trimethacrylate, trimethylolpropane propoxylate triacrylate, glycerol propoxylate trimethacrylate, glycerol propoxylate triacrylate, polycaprolactone trimethacrylate (PCLTMA), polycaprolactone triacrylate, tris-(4-hydroxyphenyl)ethane trimethacrylate, tris-(4-hydroxyphenyl)ethane triacrylate, trimethylolpropane ethoxylate trimethacrylate, trimethylolpropane ethoxylate triacrylate, glycerol ethoxylate trimethacrylate, glycerol ethoxylate triacrylate, pentaerythritol ethoxylate trimethacrylate, pentaerythritol ethoxylate triacrylate, ethylenediamine tetrakis(ethoxylate-block-propoxylate) tetramethacrylate, ethylenediamine tetrakis(ethoxylate-block-propoxylate) tetracrylate, and pentaerythritol propoxylate tetramethacrylate, pentaerythritol propoxylate tetracrylate, N,N'-methylenebisacrylamide, N,N'-methylenebismethacrylamide, N,N'-ethylenebisacrylamide, N,N'-ethylenebismethacrylamide, N,N'-propylenebisacrylamide, N,N'-propylenebismethacrylamide, N,N'-butylenebisacrylamide, N,N'-butylenebismethacrylamide, N,N'-pentylenebisacrylamide, N,N'-pentylenebismethacrylamide, N,N'-hexylenebisacrylamide, N,N'-hexylenebismethacrylamide, N,N'-heptylenebisacrylamide, N,N'-heptylenebismethacrylamide, N,N'-octylenebisacrylamide, N,N'-octylenebismethacrylamide, and combinations thereof. In preferred embodiments of the invention, the first crosslinker is selected from poly(ethylene glycol) dimethacrylate, poly(ethylene glycol) diacrylate, ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate, tetraethylene glycol diacrylate, propanediol dimethacrylate, propanediol diacrylate, 1,4-butanediol dimethacrylate, 1,4-butanediol diacrylate, 1,5-pentanediol dimethacrylate, 1,5-pentanediol diacrylate, 1,6-hexanediol dimethacrylate, 1,6-hexanediol diacrylate, 1,10-bis(acryloyloxy)decane, 1,12-dodecanediol dimethacrylate, 1,12-dodecanediol diacrylate, N,N'-methylenebisacrylamide, N,N'-methylenebismethacrylamide, N,N'-ethylenebisacrylamide, N,N'-ethylenebismethacrylamide, N,N'-propylenebisacrylamide, N,N'-propylenebismethacrylamide, N,N'-butylenebisacrylamide, N,N'-butylenebismethacrylamide, N,N'-pentylenebisacrylamide, N,N'-pentylenebismethacrylamide, N,N'-hexylenebisacrylamide, N,N'-hexylenebismethacrylamide, N,N'-heptylenebisacrylamide, N,N'-heptylenebismethacrylamide, N,N'-octylenebisacrylamide, N,N'-octylenebismethacrylamide and combinations thereof. In highly preferred embodiments of the invention, the first crosslinker is selected from ethylene glycol dimethacrylate, ethylene glycol diacrylate, N,N'-methylenebisacrylamide, N,N'-methylenebismethacrylamide and combinations thereof.

The electrochemical cell according to some embodiments of the invention, wherein the first crosslinker is selected from compounds according to formula (IIa), compounds according to formula (IIb), or combinations thereof.

(IIa)

(IIb)

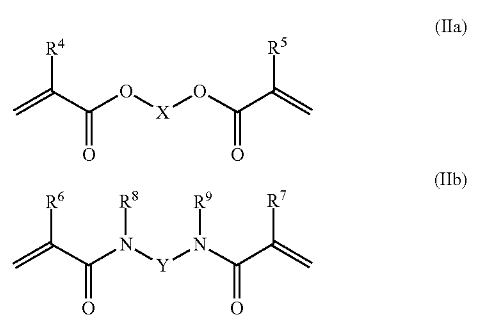

wherein $R^4$, $R^5$, $R^6$, and $R^7$ are each independently selected from H, methyl or ethyl, wherein $R^8$ and $R^9$ are each independently selected from H or methyl, wherein X is an alkanediyl or polyoxyalkylene, preferably X is $(—CH_2—)_m$ or $—CH_2—CH_2(—O—CH_2—CH_2)_o—$ wherein Y is an alkanediyl or polyoxyalkylene, preferably Y is $(—CH_2—)_n$ or $—CH_2—CH_2(—O—CH_2—CH_2)_p—$ wherein m is an integer within the range of 1-10, wherein n is an integer within the range of 1-10, wherein o is an integer within the range of 1-200, wherein p is an integer within the range of 1-200.

As is shown in the appended examples, it was found that these crosslinkers have excellent compatibility with the first monomer and result in electrochemical cells with desirable electrochemical and mechanical properties.

In preferred embodiments of the invention, X is selected from ($—CH_2—$) m wherein m is within the range of 1 to 6, preferably within the range of 1 to 4, and more preferably m is equal to 2.

In preferred embodiments of the invention, Y is selected from ($—CH_2—$) n where n is within the range of 1 to 6, preferably within the range of 1 to 4, and more preferably n is equal to 1.

As will be understood by the skilled person, in case X is $—CH_2—CH_2(—O—CH_2—CH_2)_o—$ or Y is $—CH_2—CH_2(—O—CH_2—CH_2)_p—$ the compound of formula (IIa) or (IIb) will in practise be provided in the form of a mixture of compounds with varying degrees of ethoxylation and thus varying numbers of o and p. It is preferred that in case the precursor composition comprises one or more crosslinkers according to formula (IIa) wherein X is $—CH_2—CH_2(—O—CH_2—CH_2)_o—$ the number-average o determined over all compounds of formula (IIa) in the precursor composition is within the range of 1-200, preferably within the range of 2-20. Similarly, it is preferred that in case the precursor composition comprises one or more crosslinkers according to formula (IIb) wherein Y is $—CH_2—CH_2(—O—CH_2—CH_2)_p—$ the number-average p determined over all compounds of formula (IIb) in the precursor composition is within the range of 1-200, preferably within the range of 2-20.

The precursor composition may generally comprise further additional crosslinkers other than the first crosslinker. However, in some preferred embodiments of the invention, the first crosslinker is the only crosslinker present. In general, it is preferred that the average functionality determined across all crosslinkers in the precursor composition is within the range of 2-3, preferably within the range of 2-2.5, most preferably within the range of 2-2.2. For the purposes of determining this average functionality, any compound which is polymerizable with the first monomer and which has a functionality of 2 or more is considered a crosslinker, wherein the functionality is determined on the basis of functional groups which are free-radical polymerizable with the acrylamide functionality of the first monomer.

As will be understood by the skilled person, the amount of crosslinker employed in the precursor composition of the electrochemical cell will influence the mechanical properties as well as the electrochemical properties of the obtained polymer electrolyte. In preferred embodiments of the invention, the first crosslinker is comprised in the precursor composition in an amount such that the molar ratio of the total amount of the first monomer comprised in the precursor composition to the total amount of the first crosslinker comprised in the precursor composition is within the range of 99.5:0.5 to 80:20, preferably within the range of 98:2 to 80:20, more preferably within the range of 95:5 to 85:15. In case the precursor composition comprises further additional crosslinkers other than the first crosslinker, it is preferred that the total amount of crosslinkers in the precursor composition is within the range of 99.5:0.5 to 80:20, preferably within the range of 98:2 to 80:20, more preferably within the range of 95:5 to 85:15. For the purposes of determining this total amount of crosslinkers, any compound which is polymerizable with the first monomer and which has a functionality of 2 or more is considered a crosslinker, wherein the functionality is determined on the basis of functional groups which are free-radical polymerizable with the acrylamide functionality of the first monomer.

In accordance with preferred embodiments of the invention, the precursor composition further comprises one or more radical initiators, preferably one or more radical initiators selected from thermal initiators, photoinitiators and combinations thereof.

Suitable thermal radical initiators include but are not limited to benzoyl peroxide, dibenzoyl peroxide, succinic acid peroxide, dilauroyl peroxide, didecanoyl peroxide, dicumyl peroxide, di-t-butyl peroxide, di-t-amyl peroxide, α,α'-di(t-butyl peroxy)diisopropyl-benzene, 2,5-dimethyl-2,5-di-(t-butylperoxy) hexane, 2,5-dimethyl-2,5-di-(t-butylperoxy) hexyne-3,t-butyl cumyl peroxide, α-cumyl peroxyneodecanoate, α-cumyl peroxyneopheptanoate, t-amyl peroxyneodecanoate, t-butyl peroxyneodecanoate, di-(2-ethylhexyl) peroxy-dicarbonate, t-amyl peroxypivalate, t-butyl peroxypivalate, 2,5-dimethyl-2,5 bis(2-ethylhexanoylperoxy) hexane, dibenzoyl peroxide, t-amyl peroxy-2-ethyl hexanoate, t-butyl peroxy-2-ethylhexanoate, 1,1-di-(t-amylperoxy)cyclohexane, 1,1-di-(t-butylperoxy) 3,3,5-trimethyl cyclohexane, 1,1-di-(t-butylperoxy)cyclohexane, OO-t-amyl-O(2-ethylhexyl)monoperoxycarbonate, OO-t-butyl O-isopropyl monoperoxycarbonate, OO-t-butyl O-(2-ethylhexyl)monoperoxycarbonate, t-amyl peroxybenzoate, t-butyl peroxyacetate, t-butyl peroxybenzoate, ethyl 3,3-di-(t-amylperoxy) butyrate, ethyl 3,3-di-(t-butylperoxy) butyrate, dicumyl peroxide; and azo compounds such as 4,4'-azobis(4-cyanovaleric acid), 1,1'-azobis(cyclohexane carbonitrile), azobisisobutyronitrile (AIBN), and 2,2'-azobis (2-methylpropionamidine)dihydrochloride, 2,2'-azobis[2-imidazolin-2-yl)propane]dihydrochloride, 2,2'-azobis[2-(2-imidazolin-2-yl) propane disulfate dihydrate, 2,2'-azobis(2-methylpropionamidine)dihydrochloride, 2,2'-azobis[N-(2-carboxyethyl)-2-methylpropionamidine]hydrate, 2,2'-azobis{2-[1-(2-hydroxyethyl)-2-imidazolin-2-yl] propane}dihydrochloride, 2,2'-azobis[2-(2-imidazolin-2-yl) propane], 2,2'-azobis(1-imino-1-pyrrolidino-2-ethylpropane)dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl) propionamide], cumene hydroperoxide, and ammonium persulfate.

Suitable radical photoinitiators include but are not limited to benzophenone (e.g., "IRGACURE 500"), 3-methylbenzophenone, 2-methylbenzophenone, 3,4-dimethylbenzophenone, 3-hydroxybenzophenone, 4-hydroxybenzophenone, 4,4'-dihydroxybenzophenone, 4-benzoylbenzoic acid, 2-benzoylbenzoic acid, methyl 2-benzoylbenzoate, 4,4'-carbonyldiphthalic anhydride, methylbenzoyl formate (e.g., "DAROCUR MBF"), 1-hydroxy-cyclohexyl-phenyl-ketone (e.g., "IRGACURE 184"), 2-hydroxy-2-methyl-1-phenyl-1-propanone (e.g., DAROCUR 1173"), 2-hydroxy-1-[4-(2-hydroxyethoxy)phenyl]-2-methyl-1-propanone (e.g., "IRGACURE 2959"), oxy-phenyl-acetic acid 2-[2 oxo-2 phenyl-acetoxy-ethoxy]-ethylester and oxy-phenyl-acetic 2-[2-hydroxy-ethoxy]-ethyl ester (e.g., "IRGACURE 754"), alpha, alpha-dimethoxy-alpha-phenyl-acetophenone (also known as 2,2-dimethoxy-2-phenyl-acetophenone (DMPA) e.g., "IRGACURE 651"), 2-benzyl-2-(dimethylamino)-1-[4-(4-morpholinyl)phenyl]-1-butanone (e.g., "IRGACURE 369"), 2-methyl-1-[4-(methylthio)phenyl]-2-(4-morpholinyl-1-propanone (e.g., "IRGACURE 907"), diphenyl(2,4,6-trimethylbenzoyl)-phosphine oxide (e.g., "DAROCUR TPO"), phosphine oxide, phenyl bis(2,4,6-trimethyl benzoyl) (e.g., "IRGACURE 819"), bis(eta 5-2,4-cyclopentadien-1-yl)bis[2,6-difluoro-3-(1H-pyrrol-1-yl)phenyl]titanium (e.g., "IRGACURE 784"), 1-hydroxy-cyclohexylphenyl-ketone (e.g., ("IRGACURE 184"), 2-hydroxy-2-methyl-1-phenyl-1-propanone (e.g., "DAROCUR 1173"), 2-hydroxy-1-{4-[4-(2-hydroxy-2-methyl-propionyl)-benzyl]-phenyl}-2-methyl-propan-1-one (e.g., "IRGACURE 127"), 2-hydroxy-1-[4-(2-hydroxyethoxy)phenyl]-2-methyl-1-propanone (e.g., "IRGACURE 2959"), phenylglyoxylate, oxy-phenyl-acetic acid 2-[2-oxo-2-phenyl-acetoxy-ethoxy]-ethyl ester, oxy-phenyl-acetic acid 2-[2-hydroxy-ethoxy]-ethyl ester, phenyl glyoxylic acid methyl ester (e.g., "DAROCUR MBF"), 2,4,6-trimethylbenzoyl-diphenylphosphine oxide (e.g., "LUCIRIN TPO"), 2,4,6-trimethylbenzoyl-diphenyl phosphinate (e.g., "LUCIRIN TPO-L"), liquid blend of acylphosphine oxides (e.g., "IRGACURE 2100"), bis(2,4,6-trimethylbenzoyl)-phenylphosphineoxide (e.g., "IRGACURE 819"), titanocene, bis(η5-2,4-cyclopentadien-1-yl)bis[2,6-difluoro-3-(1H-pyrrol-1-yl)phenyl] (e.g., "IRGACURE 784"), [1-(4-phenylsulfanylbenzoyl)heptylideneamino]benzoate (e.g., "IRGACURE OXE 01"), [1-[9-ethyl-6-(2-methylbenzoyl) carbazol-3-yl]ethylideneamino]acetate (e.g., "IRGACURE OXE 02"), 2-methyl-1-[4-(methylthio)phenyl]-2-morpholinopropan-1-one (e.g., "IRGACURE 907"), 2-benzyl-2-dimethylamino-1-(4-morpholinophenyl)-butanone-1 (e.g., "IRGACURE 369"), 2-dimethylamino-2-(4-methyl-benzyl)-1-(4-morpholin-4-yl-phenyl)-butan-1-one (e.g., "IRGACURE 379"), benzyldimethyl ketal, 2,2-dimethoxy-1,2-diphenylethan-1-one (e.g., "IRGACURE 651"), camphorquinone, acetophenone, 4'-hydroxyacetophenone, 3'-hydroxyacetophenone, 4-(dimethylamino)-benzophenone, 4,4'-Bis(dimethylamino)-benzophenone, 4,4'-Bis(diethylamino)-benzophenone, 4,4'-dichlorobenzophenone, 4-phenylbenzophenone, 1,4-dibenzoylbenzene, 4-(p-tolylthio)-benzophenone, dibenzosuberenone, benzil, p-anisil, methyl benzoylformate, 9,10-phenanthrenequinone, 2-benzoyl-2-propanol, 2-Hydroxy-4'-(2-hydroxyethoxy)-2-methylpropiophenone, 1-Benzoylcyclohexanol, benzoin, anisoin, benzoin methyl ether, benzoin ethyl ether, benzoin isopropyl ether, benzoin isobutyl ether, 2,2-diethoxyacetophenone, benzil dimethylketal, 2-Methyl-4'-(methylthio)-2-morpholinopropiophenone, 2-Benzyl-2-(dimethylamino)-4'-morpholinobutyrophenone, 2-Isonitrosopropiophenone, 9,10-Phenanthrenequinone, 2-ethylanthraquinone, sodium Anthraquinone-2-sulfonate, 2-chlorothioxanthone, 1-chloro-4-propoxythioxanthone, 2-isopropylthioxanthone, 2,4-diethylthioxanthen-9-one, 2,7-dimethyloxythioxanthone, 2,2'-Bis(2-chlorophenyl)4,4',5,5'-tetraphenyl-1,2'-biimidazole, Diphenyl(2,4,6-trimethyl-benzoyl)phosphine Oxide, phenylbis(2,4,6-trimethyl-benzoyl)phosphine Oxide, lithium Phenyl-(2,4,6-trimethylbenzoyl)phosphinate, and ferrocene.

In some embodiments of the invention, the precursor composition further comprises one or more radical initiators selected from 2,2-dimethoxy-2-phenyl-acetophenone (DMPA), azobisisobutyronitrile (AIBN) and combinations thereof.

The one or more radical initiators are preferably employed in an amount such that the molar ratio of the total amount of the first monomer comprised in the precursor composition to the total amount of the one or more radical initiators comprised in the precursor composition is within the range of 99.8:0.2 to 80:20, preferably within the range of 99:1 to 85:15, more preferably within the range of 98:2 to 90:10.

In preferred embodiments of the method for the preparation of the polymer electrolyte of the electrochemical cell of the present invention, the precursor composition comprises one or more radical initiators as described herein before, and comprises activating the radical initiator. The activation is preferably performed by UV irradiation of the precursor composition or by heating the precursor composition to a temperature of at least 50° C., preferably at least 60° C. It is preferred that step is performed under an inert gas atmosphere, preferably an inert atmosphere, such as nitrogen or argon.

The Electrolyte Composition

As will be understood by the skilled person, in order to obtain a gel-type polymer electrolyte, it is preferred that the polymer is synthesized in the presence of an electrolyte composition, thereby effectively encapsulating the electrolyte composition in the polymer network. However, without wishing to be bound by any theory, other methods of obtaining a polymer electrolyte as described herein may be feasible, such as exchanging another liquid composition (e.g. a solvent) encapsulated in the polymer for the electrolyte composition, absorbing the electrolyte composition into a preformed polymer network, injecting the electrolyte composition into a preformed polymer network, etc. Hence, in accordance with the invention, the polymer electrolyte comprised in the electrochemical cell is obtainable by polymerizing a precursor composition which comprises the electrolyte composition and other components as discussed throughout the present disclosure (monomer, crosslinker, initiator, etc.). In all aspects of the invention, it is highly preferred that the electrolyte composition, in the absence of the polymer network, is liquid at 20° C.

As is shown in the appended examples, the present inventors have found that deep eutectic solvent (DES) loaded polymer electrolytes exhibit exceptional performance, in particular in combination with high-potential cathode active material such as NMC622. Hence, in accordance with highly preferred embodiments of the invention, the electrolyte composition comprises or consists of a deep eutectic solvent (DES). The deep eutectic solvent is preferably liquid at 20° C.

Various relative amounts of DES to polymer have been found to result in functional electrolyte materials for the electrochemical cell of the present invention. The precursor composition preferably comprises from about 45 to 95 vol % (by total volume of the precursor composition) of the deep eutectic solvent (DES), preferably from about 55 to 90 vol %, more preferably from 70 to 90 vol %. It was found that precursor compositions having about 85 vol % DES provided superior ionic conductivity and mechanical properties (increased flexibility). Thus, in highly preferred embodiments of the invention, the precursor composition comprises from about 75 to 90 vol % (by total volume of the precursor composition) of the deep eutectic solvent (DES), preferably from about 80 to 90 vol %, most preferably from about 83 to 87 vol %. The remainder of the precursor composition is made up of the first monomer, optionally further monomers, the first crosslinker, optionally further crosslinkers, one or more radical initiators, and optional further components. In some embodiments the remainder of the precursor composition consists essentially of the first monomer, optionally further monomers, the first crosslinker, optionally further crosslinkers, and one or more radical initiators.

The deep eutectic solvent (DES) preferably has a eutectic point of less than or equal to 25° C., preferably the eutectic point is equal to or less than 15° C., more preferably less than or equal to 0° C. In highly preferred embodiments of the invention, the deep eutectic solvent (DES) has an eutectic point of less than or equal to −15° C., most preferably less than or equal to −25° C. This allows the DES to remain in a liquid state over typical operating temperature window of an electrochemical cell for regular applications such as automotive. The eutectic point referred to herein is determined at a pressure of about 101 kPa.

The deep eutectic solvent (DES) preferably comprises at least one hydrogen bond acceptor and at least one hydrogen bond donor. The molar ratio of the hydrogen bond acceptor to the hydrogen bond donor is preferably at least 1:1, more preferably at least 1:2, more preferably at least 1:3. In preferred embodiments of the invention, the electrolyte composition comprises or consists of (preferably consists of) a deep eutectic solvent (DES) comprising at least one hydrogen bond acceptor and at least one hydrogen bond donor, wherein the molar ratio of the hydrogen bond acceptor to the hydrogen bond donor is within the range of 1:1 to 1:8, preferably within the range of 1:2 to 1:6, more preferably within the range of 1:3 to 1:5. A highly preferred molar ratio of hydrogen bond acceptor to hydrogen bond donor (in particular in case the hydrogen bond acceptor is lithium bis(trifluoromethanesulfonyl)imide as described herein elsewhere and/or in case the hydrogen bond donor is N-methylacetamide as described herein elsewhere) is within the range of 1:3.5 to 1:4.5, such as about 1:4.

In preferred embodiments of the invention, the hydrogen bond acceptor comprises a lithium salt, a zinc salt or a combination thereof, preferably a lithium salt. In more preferred embodiments, the hydrogen bond acceptor is selected from the group consisting of lithium bis(trifluoromethanesulfonyl)imide (LiTFSI), lithium trifluoromethanesulfonate (LiOTf), lithium chloride (LiCl), lithium hexafluorophosphate ($LiPF_6$), lithium polysulfide, lithium perchlorate ($LiClO_4$), lithium bromide (LiBr), lithium iodide (LiI), lithium thiocyanate (LiSCN), lithium tetrafluoroborate ($LiBF_4$), lithium hexafluoroarsenate ($LiAsF_6$), lithium bis(oxalate)borate (LiBOB), lithium fluoroalkylphosphate (LFAP [$LiPF_3(CF_2CF_3)_3$]), and combinations thereof, preferably lithium bis(trifluoromethanesulfonyl)imide (LiTFSI) and/or the hydrogen bond donor is selected from the group consisting of urea, N-methylurea, N,N-dimethylurea, N,N'-dimethylurea, N,N,N'-trimethylurea, thiourea, N-methylthiourea, N,N-dimethylthiourea, N,N'-dimethylthiourea, N,N,N'-trimethylthiourea, ethylene glycol, propane-1,2-diol, propane-1,3-diol, butane-1,4-diol, 1,2,3-propanetriol, acetic acid, oxalic acid, malonic acid, succinic acid, glutaric acid, adipic acid, pimelic acid, suberic acid, azelaic acid, sebacic acid, undecanedioic acid, dodecanedioic acid, benzoic acid, glycolic acid, citric acid, 2-hydroxy propionic acid, 2-hydroxy isobutyric acid, o-phenylenediamine, choline chloride, acetamide, N-methylacetamide, trifluoroacetamide, N-methyl trifluoroacetamide, benzamide, benzenesulphonic acid, p-toluenesulphonic acid, o-toluenesulphonic acid, m-toluenesulphonic acid, and combinations thereof, preferably N-methylacetamide.

Hence, in some embodiments of the invention, the electrolyte composition of the electrochemical cell consists of a deep eutectic solvent (DES) comprising, preferably consisting of lithium bis(trifluoromethanesulfonyl)imide (LiTFSI) and N-methylacetamide wherein the molar ratio of lithium bis(trifluoromethanesulfonyl)imide (LiTFSI) to N-methylacetamide is within the range of 1:1 to 1:8, preferably within the range of 1:2 to 1:6, more preferably within the range of 1:3 to 1:5, such as about 1:4.

The electrolyte composition preferably comprises at least 90 wt. % (by total weight of the electrolyte composition) of the DES, preferably at least 95 wt. %, more preferably at least 99 wt. %. In some embodiments, the electrolyte composition comprises water, such as 0.1-30 wt. % (by total weight of the electrolyte composition) of water, or 0.1-10 wt. % (by total weight of the electrolyte composition) of water. In other, preferred embodiments, the electrolyte composition comprises less than 5 wt. % of water, preferably less than 0.1 wt. % water, more preferably less than 0.01 wt. % of water. In some embodiments, the electrolyte composition is substantially free of water. The latter is particularly preferred for use in combination with moisture sensitive electrodes such as Li or graphite. In all embodiments described herein, the electrolyte composition preferably consists of the deep eutectic solvent (DES).

As will be understood by the skilled person in the context of the present disclosure, the precursor composition mainly consists of the electrolyte composition as described herein in combination with the first monomer, the first crosslinker and the one or more initiators as described herein. Hence, according to preferred embodiments of the invention, the precursor composition comprises at least 90 wt. % (by total weight of the precursor composition) of the combined amount of the electrolyte composition, the first monomer, optionally further monomers, the first crosslinker, optionally further crosslinkers and one or more radical initiators, preferably at least 95 wt. % (by total weight of the precursor composition), more preferably at least 99 wt. % (by total weight of the precursor composition). In some embodiments the precursor composition comprises at least 90 wt. % (by total weight of the precursor composition) of the combined amount of the electrolyte composition, the first monomer, the first crosslinker, and one or more radical initiators, preferably at least 95 wt. % (by total weight of the precursor composition), more preferably at least 99 wt. % (by total weight of the precursor composition). As explained herein earlier, any compound which is polymerizable with the first monomer and has a functionality of 1 is considered a monomer, and any compound which is polymerizable with the first monomer and which has a functionality of 2 or more is considered a crosslinker, wherein the functionality is determined on the basis of functional groups which are free-radical polymerizable with the acrylamide functionality of the first monomer. Consequently, in accordance with preferred embodiments of the invention, the polymer electrolyte comprises at least 90 wt. % (by total weight of the polymer electrolyte) of the combined weight of the polymer network and the electrolyte composition, more preferably at least 98 wt. % (by total weight of the polymer electrolyte) and most preferably at least 99 wt. % (by total weight of the polymer electrolyte). In some embodiments the polymer electrolyte consists essentially of the polymer network and the electrolyte composition.

In preferred embodiments of the invention, the electrochemical cell of the invention is provided wherein the polymer electrolyte has an anodic stability limit of at least 4.6 V vs $Li^+/Li$, preferably at least 4.7 V vs $Li^+/Li$.

The Cathode

As is shown in the appended examples, the present inventors have found that the polymer electrolytes used in the electrochemical cell of the invention exhibit surprisingly good electrochemical performance when used in conjunction with high-potential cathode active material. Hence, the cathode active material preferably has an upper cut-off voltage of at least 4.3 V vs. $Li^+/Li$, preferably at least 4.4 V vs. $Li^+/Li$, more preferably at least 4.5 V vs. $Li^+/Li$.

In accordance with preferred embodiments of the invention, the cathode active material comprising Li, M and O, wherein M comprises Ni and one or both of Mn and Co, wherein M comprises:

Ni in a content x, wherein 50.0 mol %≤x≤85.0 mol %,

Mn in a content y, wherein 7.5 mol %≤y≤25.0 mol %,

Co in a content z, wherein 7.5 mol %≤z≤25.0 mol %,
D in a content a, wherein 0.0 mol %≤a≤2.0 mol %, wherein D is at least one element other than Li, Ni, Mn, Co, and O,
wherein x+y+z+a is 100.0 mol %;
preferably wherein M comprises:
Ni in a content x, wherein 50.0 mol %≤x≤80.0 mol %,
Mn in a content y, wherein 10.0 mol %≤y≤25.0 mol %,
Co in a content z, wherein 10.0 mol %≤z≤25.0 mol %,
D in a content a, wherein 0.0 mol %≤a≤2.0 mol %, wherein D is at least one element other than Li, Ni, Mn, Co, and O,
wherein x+y+z+a is 100.0 mol %;
more preferably wherein M comprises:
Ni in a content x, wherein 55.0 mol %≤x≤75.0 mol %,
Mn in a content y, wherein 12.5 mol %≤y≤22.5 mol %,
Co in a content z, wherein 12.5 mol %≤z≤22.5 mol %,
D in a content a, wherein 0.0 mol %≤a≤2.0 mol %, wherein D is at least one element other than Li, Ni, Mn, Co, and O,
wherein x+y+z+a is 100.0 mol %;
most preferably wherein M comprises:
Ni in a content x, wherein 55.0 mol %≤x≤70.0 mol %,
Mn in a content y, wherein 15.0 mol %≤y≤22.5 mol %,
Co in a content z, wherein 15.0 mol %≤z≤22.5 mol %,
D in a content a, wherein 0.0 mol %≤a≤2.0 mol %, wherein D is at least one element other than Li, Ni, Mn, Co, and O,
wherein x+y+z+a is 100.0 mol %.

As is known to the skilled person, NMC cathode active material can comprise impurities, or be doped or coated resulting in an overall cathode active material comprising one or more elements other than Li, Ni, Mn, Co and O, which is reflected in the parameter "D" used herein. In preferred embodiments of the invention, D is an element selected from the group consisting of: Al, B, Ba, Ca, Cr, Fe, Mg, Mo, Nb, S, Si, Sr, Ti, Y, V, W Zr, and Zn; preferably Al, B, Cr, Nb, S, Si, Ti, Y, Zr and W; more preferably B, Nb, Ti, Zr and W.

Examples of suitable cathode active materials are NMC532, NMC622, NMC811, preferably NMC622 or NMC811, most preferably NMC622.

An optional but preferred additional component of the cathode comprised in the electrochemical cell of the invention is a conductivity aid, in particular a carbon-based conductivity aid. The carbon-based conductivity aid may be any carbon-rich material, such as any material comprising at least 95 wt. % carbon, preferably any material comprising at least 99 wt. % carbon. Examples of suitable materials are graphite, carbon black, carbon fibers, carbon nanotubes, graphene and combinations thereof. Carbon black is known to the skilled person and includes variants such as acetylene black or super C65.

In preferred embodiments, the carbon-based conductivity aid as described herein is present in the cathode comprised in the electrochemical cell of the present invention in an amount of at least 0.5 wt. % (by total weight of the cathode), preferably at least 1 wt. % (by total weight of the cathode), more preferably at least 3 wt. % (by total weight of the cathode). Typically, the carbon-based conductivity aid is present in an amount of less than 12 wt. % (by total weight of the cathode), preferably less than 9 wt. % (by total weight of the cathode), more preferably less than 7 wt. % (by total weight of the cathode).

In some embodiments of the invention the cathode comprised in the electrochemical cell of the present invention further comprises a binder, such as a polymer binder. The binder is not particularly limiting and can be any suitable polymer binder, such as polyimide (PI), polyvinylidene chloride (PVdC), polyethylene oxide (PEO), polyvinylidene fluoride (PVdF) and the like.

Method for the Production of the Electrochemical Cell of the Invention

In accordance with the invention, there is provided a method for the production of an electrochemical cell, comprising the following steps:

(a) providing a cathode,
(b) providing an anode,
(c) providing an electrolyte,
(d) forming the electrochemical cell by assembling the cathode, the anode, and the polymer electrolyte into an electrochemical cell, wherein the cathode comprises cathode active material as described herein,
wherein the electrolyte comprises the polymer electrolyte as described in herein, and/or wherein the cathode is provided in the form of a composite cathode comprising cathode active material and the polymer electrolyte as described herein.

The embodiments described in the present disclosure relating to the electrochemical cell, apply mutatis mutandis to the method for the production of the electrochemical cell. For example, the various embodiments relating to the identity and amounts of monomer, crosslinker, initiator, electrolyte composition as explained herein in the context of the electrochemical cell are equally applicable to the method for the preparation of the electrochemical cell.

In preferred embodiments, step (d) comprises placing the polymer electrolyte of the invention between and in contact with the anode and the cathode.

Batteries Comprising the Electrochemical Cells of the Invention and Uses Thereof Another aspect of the present invention concerns a battery, more specifically a lithium-ion battery or a lithium metal battery comprising at least one electrochemical cell as described herein, for example, two or more electrochemical cells as described herein.

Electrochemical cells as described herein can be combined with one another, for example in series connection or in parallel connection. Series connection is preferred. The electrochemical cells or batteries described herein can be used for making or operating cars, computers, personal digital assistants, mobile telephones, watches, camcorders, digital cameras, thermometers, calculators, laptop BIOS, communication equipment, satellites or remote car locks, and stationary applications such as energy storage devices for power plants.

A further aspect of the present invention is a method of making or operating cars, computers, personal digital assistants, mobile telephones, watches, camcorders, digital cameras, thermometers, calculators, laptop BIOS, communication equipment, satellites, remote car locks, and stationary applications such as energy storage devices for power plants by employing at least one battery or the at least one electrochemical cell as described herein.

A further aspect of the present disclosure is the use of the electrochemical cell or the battery as described herein, in motor vehicles, bicycles operated by electric motor, robots, aircraft (for example unmanned aerial vehicles including drones), ships, satellites or stationary energy stores.

A further aspect of the present invention is a method of providing power to an apparatus, wherein the power is supplied by the electrochemical cell or the battery as described herein, comprising the polymer electrolyte of the invention, wherein the electrochemical cell or the battery as described herein, preferably the electrochemical cell, is operated at a voltage above 4.4 V, preferably above 4.5 V, more preferably above 4.6 V, such as above 4.7 V. The apparatus may be any battery-powered apparatus, but is preferably selected from motor vehicles, computers, personal digital assistants, mobile telephones, watches, camcorders, digital cameras, thermometers, calculators, laptop BIOS, communication equipment, satellites, remote car locks, stationary applications such as energy storage devices for power plants, bicycles operated by electric motor, robots, aircraft (for example unmanned aerial vehicles including drones), ships, satellites, etc.

The present invention further provides a device comprising at least one battery or electrochemical cell of the invention. Preferred are mobile devices such as vehicles, for example automobiles, bicycles, aircraft, satellites, or water vehicles such as boats or ships. Other examples of mobile devices are those which are portable, for example computers, especially laptops, telephones or electrical power tools, for example from the construction sector, especially drills, battery-driven screwdrivers or battery-driven tackers.

Examples

1. Preparation of Material

An electrolyte composition consisting of deep eutectic solvent (DES) was prepared by mixing lithium bis(trifluoromethanesulfonyl)imide (LiTFSI) and N-methylacetamide in a 1:4 molar ratio with vigorous stirring until a homogeneous transparent liquid was obtained. A precursor composition was prepared by mixing the monomer indicated in table 1, the crosslinker indicated in table 1, and the free radical initiator indicated in table 1, into a premix having a (monomer:crosslinker):initiator molar ratio of (90:10):5, and combining the DES with the premix in a DES:premix volume ratio of 85:15. The resulting mixture was stirred to obtain a homogeneous blend and polymerized by means of UV-illumination (365 nm) for 1 h.

Cathodes comprising NMC622 as cathode active material ($LiNi_{0.6}Mn_{0.2}Co_{0.2}O_2$) were formulated with 80 wt. % $LiNi_{0.6}Mn_{0.2}Co_{0.2}O_2$, 10 wt. % carbon black, and 10 wt. % poly(vinylidene fluoride) (PVDF) by mixing them in N-methyl-2-pyrrolidone (NMP). The well-mixed slurry was tape-casted on aluminium foil and dried in air at 110° C. to obtain electrodes with a thickness of approximately of ~18.7 μm and an active material loading of 0.622 mg $cm^{-2}$ (0.109 mAh $cm^{-2}$, assuming a theoretical capacity of 175 mAh $g^{-1}$ for the NMC622).

For use in coin cells, the polymer electrolyte and cathode were cut to appropriate size by means of a hollow punch. The Li|polymer electrolyte|NMC622 cells were assembled by placing the positive electrode in front of a Li foil negative electrode separated by the polymer electrolyte in between.

TABLE 1

| Example | Monomer | Crosslinker | Initiator |
|---|---|---|---|
| Example 1 | N-Isopropylacrylamide | Ethylene glycol dimethacrylate | 2,2-dimethoxy-2-phenyl-acetophenone |
| Example 2 | N-Isopropylacrylamide | N,N'-methylenebisacrylamide | 2,2-dimethoxy-2-phenyl-acetophenone |
| Example 3 | N-Hydroxyethyl acrylamide | Ethylene glycol dimethacrylate | 2,2-dimethoxy-2-phenyl-acetophenone |
| Example 4 | N-Hydroxyethyl acrylamide | N,N'-methylenebisacrylamide | 2,2-dimethoxy-2-phenyl-acetophenone |
| Example 5 (comparative) | 4-acryloylmorpholine | Ethylene glycol dimethacrylate | 2,2-dimethoxy-2-phenyl-acetophenone |
| Example 6 (comparative) | 4-acryloylmorpholine | N,N'-methylenebisacrylamide | 2,2-dimethoxy-2-phenyl-acetophenone |
| Example 7 | N,N-diethylacrylamide | Ethylene glycol dimethacrylate | 2,2-dimethoxy-2-phenyl-acetophenone |
| Example 8 | N,N-diethylacrylamide | N,N'-methylenebisacrylamide | 2,2-dimethoxy-2-phenyl-acetophenone |

2. Determination of Electrochemical Performance

The ionic conductivity was determined by electrochemical impedance spectroscopy (EIS) (using a Biologic SP-300) of the polymer electrolyte in a symmetric stainless steel|electrolyte|stainless steel Swagelok-type cell at the specified temperature by perturbing the open-circuit potential with an AC sinusoidal potential of 10 mV amplitude over a frequency range of 10 kHz-100 mHz.

The electrochemical compatibility of the polymer electrolyte with high-voltage cathode materials was studied by electrochemical impendence spectroscope (EIS) of NMC622|polymer electrolyte|NMC622 symmetrical cells.

The anodic stability limit was determined by linear sweep voltammetry (using a Bio-Logic, SP-300) of the polymer electrolyte which was sandwiched between a stainless-steel working electrode and a lithium metal reference and counter electrode in a coin cell setup wherein the voltage at the working electrode was swept from the open circuit potential to 6 V vs $Li^+/Li$ in the anodic scan, with a scan rate of 10 mV $s^{-1}$. The stability limit was determined as the onset of electrolyte oxidation, which can be observed by a sudden increase in the measured current.

The cycling performance was determined on the Li' polymer electrolyte|NMC622 cells prepared as explained above using a TOYO battery cycler. The cells underwent a 16 h open-circuit potential (OCP) period prior to galvanostatic cycling between 3.0 and 4.3 V vs. $Li^+/Li$. The electrodes were activated by two galvanostatic charge/discharge cycles at C/20 between 3.0 V and 4.3 V vs $Li^+/Li$. Cycling protocol consisted of 5 cycles each at C-rates C/20, C/10, C/5, C/2 1C followed by 100 cycles at C/10. Capacity values are normalized with respect to the weight of cathode active material (NMC) and results were verified with reproducibility.

3. Results

The results of the electrochemical characterisation of the polymer electrolytes employed in the electrochemical cells of the present invention are shown in FIGS. 1-20 and Table 2. Table 2 illustrates the excellent ionic conductivity of the polymer electrolytes employed in the electrochemical cells according to the invention at three different temperatures. Table 2 also highlights the compatibility of the polymer electrolytes employed in the electrochemical cells of the invention towards NMC622 cathode active material, as can in particular be derived from FIGS. 17-20 (showing the cycling performance).

Table 2 also shows the high anodic stability values measured for in particular examples 1, 2, 7 and 8, indicating that they can operate at high voltages.

FIGS. 9-16 show the EIS results on the NMC622|polymer electrolyte|NMC622 symmetrical cells. For the polymer electrolytes employed in the electrochemical cells of the invention, there is no significant increase of the charge transfer resistance, Rct, implying that the NMC622|polymer electrolyte interface is chemically stable. Conversely, for the comparative examples, it can be seen that the polymer electrolyte is not compatible with NMC622.

FIGS. 17-20 show the cycling capacity on the Li|polymer electrolyte|NMC622 cells, showing the excellent compatibility of the polymer electrolyte of the invention with high potential cathode material such as NMC622.

TABLE 2

| Example | Anodic stability limit vs. Li+/Li (V) | Ionic conductivity (mS $cm^{-1}$) 25° C. | 40° C. | 55° C. | Compatible with NMC622 |
|---|---|---|---|---|---|
| Example 1 | ~5.0 | 0.819 | 1.573 | 2.911 | Yes |
| Example 2 | ~5.0 | 0.555 | 1.181 | 1.958 | Yes |
| Example 3 | ~4.0 | 0.553 | 1.016 | 2.135 | Yes |
| Example 4 | ~4.0 | 0.414 | 0.875 | 1.576 | Yes |
| Example 5 (comparative) | ~4.4 | 0.700 | 1.481 | 2.682 | No |
| Example 6 (comparative) | ~4.5 | 0.400 | 0.836 | 1.520 | No |
| Example 7 | ~4.7 | 1.011 | 1.976 | 3.262 | Yes |
| Example 8 | ~4.8 | 0.582 | 1.185 | 2.028 | Yes |

The polymer electrolytes of examples 1-8 were all found to be self-standing and to exhibit good mechanical flexibility.

4. Composite Cathode Synthesis and Characterisation

An electrolyte composition consisting of deep eutectic solvent (DES) was prepared by mixing lithium bis(trifluoromethanesulfonyl)imide (LiTFSI) and N-methylacetamide in a 1:4 molar ratio with vigorous stirring until a homogeneous transparent liquid was obtained. A precursor composition was prepared by mixing the monomer indicated in table 3, the crosslinker indicated in table 3, and the free radical initiator indicated in table 3, into a premix having a (monomer:crosslinker):initiator molar ratio of (90:10):5, and combining the DES with the premix in a DES:premix volume ratio of 85:15.

Cathodes comprising NMC622 as cathode active material ($LiNi_{0.6}Mn_{0.2}Co_{0.2}O_2$) were formulated with 80 wt. % $LiNi_{0.6}Mn_{0.2}Co_{0.2}O_2$, 10 wt. % carbon black, and 10 wt. % poly(vinylidene fluoride) (PVDF) by mixing them in N-methyl-2-pyrrolidone (NMP). The well-mixed slurry was tape-casted on aluminium foil and dried in air at 110° C. to obtain electrodes.

An impregnated composite cathode (Example 9) was prepared by drop-casting the precursor composition on top of the NMC622 electrode and allowing it to impregnate the pores of the electrode. UV curing (365 nm) for 1 hour was then applied to form the impregnated electrode. An NMC622 impregnated electrode|polymer electrolyte|NMC622 impregnated electrode cell was assembled using a layer of polymer electrolyte as a separator between the symmetrical impregnated electrodes. The polymer electrolyte was prepared by polymerisation of the same precursor composition in the absence of the cathode material.

A comparative cell was prepared using non-impregnated electrodes (Example 10).

The ionic conductivity was determined by electrochemical impedance spectroscopy (EIS) (using a Biologic SP-300) of the symmetrical cells at the specified temperature by perturbing the open-circuit potential with an AC sinusoidal potential of 10 mV amplitude over a frequency range of 10 kHz-100 mHz.

TABLE 3

| Example | Monomer | Crosslinker | Initiator | Electrode |
|---|---|---|---|---|
| Example 9 | N-Isopropylacrylamide | Ethylene glycol dimethacrylate | 2,2-dimethoxy-2-phenyl-acetophenone | Impregnated NMC 622 |
| Example 10 | N-Isopropylacrylamide | Ethylene glycol dimethacrylate | 2,2-dimethoxy-2-phenyl-acetophenone | NMC622 |

Figure 21:
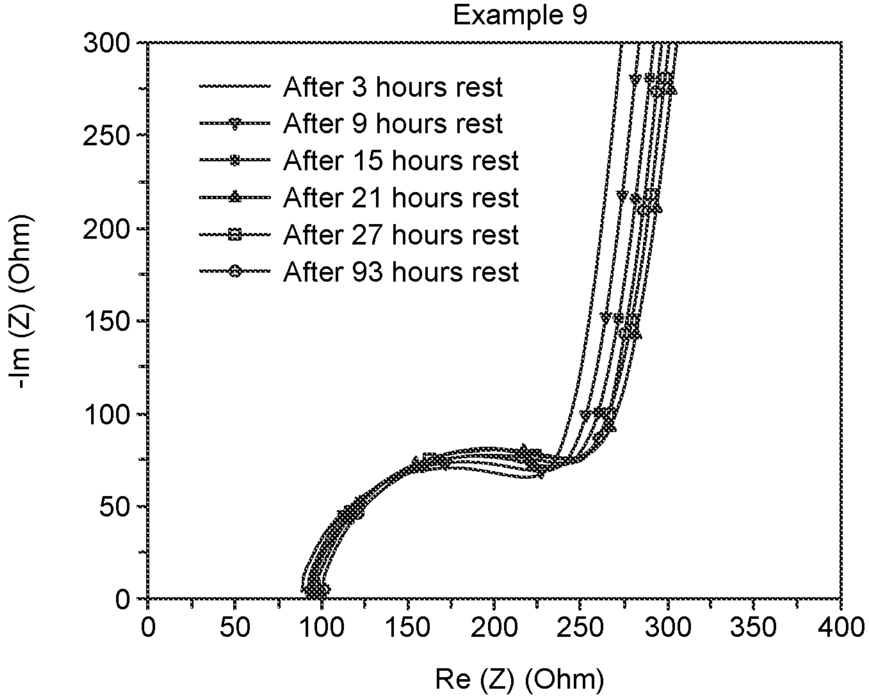
FIG. 21 shows the EIS characterisation of symmetric cells comprising NMC622 impregnated with the polymer electrolyte of Example 9 electrodes and the polymer electrolyte of Example 9 (impedance after every 6 hours).
Figure 22:
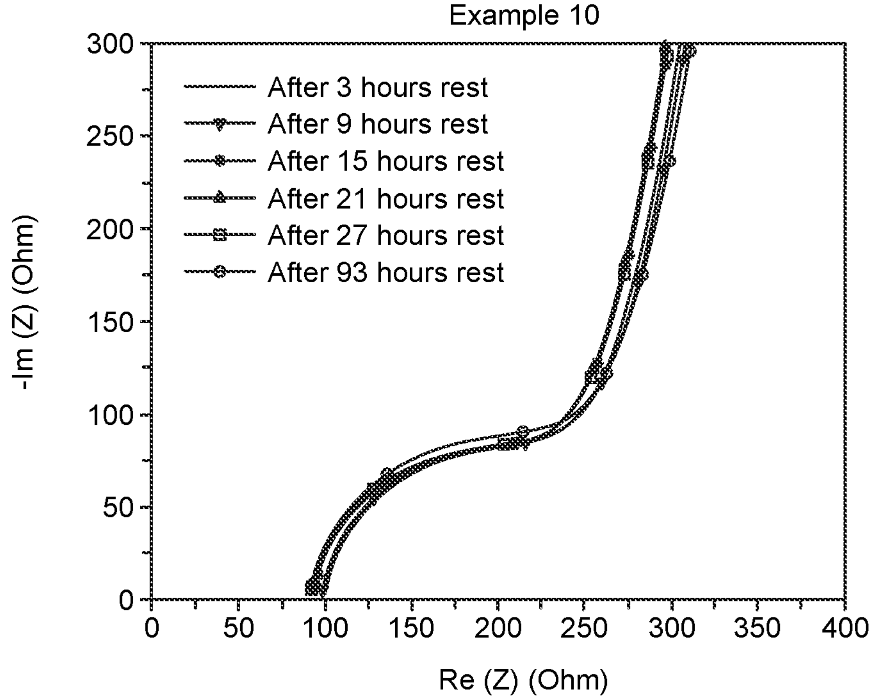
FIG. 22 shows the EIS characterisation of symmetric cells comprising the NMC622 electrodes and the polymer electrolyte of Example 10 (impendence after every 6 hours).

FIG. 21 shows the EIS characterisation of the NMC622 impregnated electrode|polymer electrolyte|NMC622 impregnated electrode cell. FIG. 22 shows a comparative example of the EIS characterisation of the NMC622|polymer electrolyte|NMC622 cell. It can be seen that the impregnation of the polymer electrolyte into the pores of the NMC622 electrode does not lead to a significant increase in charge transfer resistance, indicating that the composite cathodes described herein will yield good performance.

Polymer electrolytes comprising a polymer network based on specific (meth)acrylamide monomers effectively encapsulate deep eutectic solvents (DES) and are surprisingly compatible with electrode active materials comprising Li, M and O, wherein M comprises Ni and one or both of Mn and Co. The polymer electrolytes described herein have excellent cycling stability when combined with a high potential electrode active material such as NMC622. The polymer electrolyte can be pre-synthesised but may also be synthesised in the presence of cathode active material, thereby providing a composite cathode material. One or more of the objects of the invention are achieved by the different aspects of the invention described herein.

1. An electrochemical cell comprising an anode, a cathode and a polymer electrolyte, wherein the cathode comprises cathode active material comprising Li, M, and O, wherein M comprises Ni in a content x, wherein 50.0 mol %≤x≤95.0 mol %, Mn in a content y, wherein 0.0 mol %≤y≤40.0 mol %, Co in a content z, wherein 0.0 mol %≤z≤40.0 mol %, D in a content a, wherein 0.0 mol %≤a≤2.0 mol %, wherein D is at least one element other than Li, Ni, Mn, Co, and O, wherein x+y+z+a is 100.0 mol %;

wherein the polymer electrolyte comprises an electrolyte composition and a polymer network, wherein the electrolyte composition preferably comprises a deep eutectic solvent (DES), wherein the polymer electrolyte is obtainable by polymerizing a precursor composition comprising the electrolyte composition and a first monomer according to formula (I)

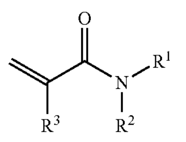

(I)

wherein $R^1$ represents a first substituent having from 1 to 8 carbon atoms and optionally comprising at least one functional group selected from alcohols, amines, ethers, ketones, amides, acetals, ketals, aminoacetals, hemiaminal ethers or combinations thereof, preferably wherein $R^1$ is selected from $C_1$-$C_6$ alkyl, $C_1$-$C_6$ hydroxyalkyl, —$(CH_2$—$CH_2$—$O)_n$—H;

and wherein $R^2$ represents H or a second substituent having from 1 to 8 carbon atoms and comprising at least one functional group selected from alcohols, amines, ethers, ketones, amides, acetals, ketals, aminoacetals, hemiaminal ethers or combinations thereof, preferably wherein $R^2$ is selected from H, $C_1$-$C_6$ alkyl, $C_1$-$C_6$ hydroxyalkyl, —$(CH_2$—$CH_2$—$O)_n$—H;

wherein $R^3$ is selected from H, methyl or ethyl; and wherein n is an integer from 1 to 5.

2. The electrochemical cell of claim 1, wherein the anode and the cathode have a different composition.

3. The electrochemical cell of any one of the previous claims, wherein the first monomer is according to option A, B or C:

A. $R^1$ is selected from $C_1$-$C_6$ alkyl, preferably $R^1$ is a $C_3$ alkyl, and $R^2$ is selected from H or methyl, preferably $R^2$ is H, and $R^3$ is selected from H or methyl, preferably $R^3$ is H; or B. $R^1$ is selected from $C_1$-$C_6$ alkyl, preferably $R^1$ is a $C_2$ alkyl, and $R^2$ is selected from selected from $C_1$-$C_6$ alkyl, preferably $R^2$ is a $C_2$ alkyl, and $R^3$ is selected from H or methyl, preferably $R^3$ is H; or C. $R^1$ is selected from $C_1$-$C_6$ hydroxyalkyl, wherein the $C_1$-$C_6$ hydroxyalkyl comprises one hydroxyl functional group, preferably $R^1$ is 2-hydroxyethyl, $R^2$ is selected from H or methyl, preferably $R^2$ is H, and $R^3$ is selected from H or methyl, preferably $R^3$ is H.

4. The electrochemical cell according to any one of the previous claims, wherein the precursor composition further comprises a first crosslinker.

5. The electrochemical cell according to claim 4, wherein the first crosslinker is selected from crosslinkers comprising two or more functional groups selected from the group consisting of allyl (—$CH_3$—CH═$CH_2$), oxiranyl (—$C_2H_3O$), glycidyl (—$CH_2$—$C_2H_3O$), vinyl ether (—O—CH═$CH_2$), vinyl ester (—C(O)—O—CH═$CH_2$), vinyl amide (—C(O))—NH—CH═$CH_2$), vinyl amine (—NH—CH═$CH_2$), norbornene, maleate, fumarate, itaconate, alkynyl (—C≡CH), styrene (-Ph-CH═$CH_2$), acrylamide (—NH—C(O)—CH═$CH_2$), methacrylamide (—NH—C(O)—C($CH_3$)═$CH_2$), acrylate (—O—C(O)—CH═$CH_2$), methacrylate (—O—C(O)—C($CH_3$)═$CH_2$) and combinations thereof, preferably the first crosslinker is selected from crosslinkers comprising two or more functional groups selected from acrylamide (—NH—C(O)—CH═$CH_2$), methacrylamide (—NH—C(O)—C($CH_3$)═$CH_2$), acrylate (—O—C(O)—CH═$CH_2$), methacrylate (—O—C(O)—C($CH_3$)═$CH_2$) and combinations thereof.

6. The electrochemical cell according to any one of claim 4 or 5, wherein the first crosslinker is comprised in the precursor composition in an amount such that the molar ratio of the total amount of the first monomer comprised in the precursor composition to the total amount of the first crosslinker comprised in the precursor composition is within the range of 99.5:0.5 to 80:20, preferably within the range of 98:2 to 80:20, more preferably within the range of 95:5 to 85:15.

7. The electrochemical cell according to any one of the previous claims, wherein the deep eutectic solvent (DES) has a eutectic point of less than or equal to 25° C.

8. The electrochemical cell according to any one of the previous claims, wherein the deep eutectic solvent (DES) comprises at least one hydrogen bond acceptor and at least one hydrogen bond donor, wherein the at least one hydrogen bond acceptor comprises a lithium salt, a zinc salt or a combination thereof, preferably a lithium salt.

9. The electrochemical cell according to claim 8, wherein the at least one hydrogen bond acceptor is selected from the group consisting of lithium bis(trifluoromethanesulfonyl)imide (LiTFSI), lithium trifluoromethanesulfonate (LiOTf), lithium chloride (LiCl), lithium hexafluorophosphate ($LiPF_6$), lithium polysulfide, lithium perchlorate ($LiClO_4$), lithium bromide (LiBr), lithium iodide (LiI), lithium thiocyanate (LiSCN), lithium tetrafluoroborate ($LiBF_4$), lithium hexafluoroarsenate ($LiAsF_6$), lithium bis(oxalate)borate (LiBOB), lithium fluoroalkylphosphate (LFAP [$LiPF_3(CF_2CF_3)_3$]), and combinations thereof, preferably lithium bis(trifluoromethanesulfonyl)imide (LiTFSI).

10. The electrochemical cell according to claim 8 or 9, wherein the at least one hydrogen bond donor is selected from the group consisting of urea, N-methylurea, N,N-dimethylurea, N,N'-dimethylurea, N,N,N'-trimethylurea, thiourea, N-methylthiourea, N,N-dimethylthiourea, N,N'-dimethylthiourea, N,N,N'-trimethylthiourea, ethylene glycol, propane-1,2-diol, propane-1,3-diol, butane-1,4-diol, 1,2,3-propanetriol, acetic acid, oxalic acid, malonic acid, succinic acid, glutaric acid, adipic acid, pimelic acid, suberic acid, azelaic acid, sebacic acid, undecanedioic acid, dodecanedioic acid, benzoic acid, glycolic acid, citric acid, 2-hydroxy propionic acid, 2-hydroxy isobutyric acid, o-phenylenediamine, choline chloride, acetamide, N-methylacetamide, trifluoroacetamide, N-methyl trifluoroacetamide, benzamide, benzenesulphonic acid, p-toluenesulphonic acid, o-toluenesulphonic acid, m-toluenesulphonic acid, and combinations thereof, preferably N-methylacetamide.

11. The electrochemical cell according to any one of the previous claims, wherein
$R^1$ and $R^2$ are the same, preferably $R^1$ and $R^2$ are both ethyl, and wherein $R^3$ is selected from H or methyl, preferably $R^3$ is H; or
$R^1$ is a $C_3$ alkyl, preferably isopropyl, and $R^2$ is selected from H or methyl, preferably $R^2$ is H, and $R^3$ is selected from H or methyl, preferably $R^3$ is H.

12. The electrochemical cell according to any one of the previous claims, wherein the polymer electrolyte is coated on and/or at least partially embedded in the cathode active material.

13. The electrochemical cell according to any one of the previous claims, wherein M comprises:
Ni in a content x, wherein 50.0 mol %≤x≤85.0 mol %,
Mn in a content y, wherein 7.5 mol %≤y≤25.0 mol %,
Co in a content z, wherein 7.5 mol %≤z≤25.0 mol %,
D in a content a, wherein 0.0 mol %≤a≤2.0 mol %, wherein D is at least one element other than Li, Ni, Mn, Co, and O,
wherein x+y+z+a is 100.0 mol %;
preferably wherein M comprises:
Ni in a content x, wherein 50.0 mol %≤x≤80.0 mol %,
Mn in a content y, wherein 10.0 mol %≤y≤25.0 mol %,
Co in a content z, wherein 10.0 mol %≤z≤25.0 mol %,
D in a content a, wherein 0.0 mol %≤a≤2.0 mol %, wherein D is at least one element other than Li, Ni, Mn, Co, and O,
wherein x+y+z+a is 100.0 mol %;
more preferably wherein M comprises:
Ni in a content x, wherein 55.0 mol %≤x≤75.0 mol %,
Mn in a content y, wherein 15.0 mol %≤y≤25.0 mol %,
Co in a content z, wherein 15.0 mol %≤z≤25.0 mol %,
D in a content a, wherein 0.0 mol %≤a≤2.0 mol %, wherein D is at least one element other than Li, Ni, Mn, Co, and O,
wherein x+y+z+a is 100.0 mol %;
most preferably wherein M comprises:
Ni in a content x, wherein 55.0 mol %≤x≤70.0 mol %,
Mn in a content y, wherein 20.0 mol %≤y≤25.0 mol %,
Co in a content z, wherein 20.0 mol %≤z≤25.0 mol %,
D in a content a, wherein 0.0 mol %≤a≤2.0 mol %, wherein D is at least one element other than Li, Ni, Mn, Co, and O,
wherein x+y+z+a is 100.0 mol %.

14. A method for the production of an electrochemical cell according to any one of the previous claims, comprising the following steps:
a) providing a cathode comprising cathode active material as described in any one of claims 1-13,
b) providing an anode,
c) providing an electrolyte,
d) forming the electrochemical cell by assembling the cathode, the anode, and the polymer electrolyte into an electrochemical cell,
wherein the electrolyte comprises the polymer electrolyte as described in any one of claims 1-13, and/or wherein the cathode is provided in the form of a composite cathode comprising the cathode active material and the polymer electrolyte as described in any one of claims 1-13.

15. Use of a polymer electrolyte as described in any one of claims 1-13 as an electrolyte for an electrochemical cell comprising a cathode comprising cathode active material wherein the cathode active material comprises Li, M, and O, wherein M comprises
Ni in a content x, wherein 50.0 mol %≤x≤95.0 mol %, preferably
Mn in a content y, wherein 0.0 mol %≤y≤40.0 mol %,
Co in a content z, wherein 0.0 mol %≤z≤40.0 mol %,
D in a content a, wherein 0.0 mol %≤a≤2.0 mol %, wherein D is at least one element other than Li, Ni, Mn, Co, and O,
wherein x+y+z+a is 100.0 mol %.

The invention claimed is:

1. An electrochemical cell comprising an anode, a cathode and a
polymer electrolyte, wherein the anode and the cathode have a different composition wherein the cathode comprises cathode active material comprising Li, M, and O, wherein M comprises
Ni in a content x, wherein 50.0 mol %≤x≤95.0 mol %,
Mn in a content y, wherein 0.0 mol %≤y≤40.0 mol %,
Co in a content z, wherein 0.0 mol %≤z≤40.0 mol %,
D in a content a, wherein 0.0 mol %≤a≤2.0 mol %, wherein D is at least one element other than Li, Ni, Mn, Co, and O,
wherein x+y+z+a is 100.0 mol %;
wherein the polymer electrolyte comprises an electrolyte composition and a polymer network, wherein the electrolyte composition comprises a deep eutectic solvent (DES),
wherein the polymer electrolyte is obtainable by polymerizing a precursor composition comprising the electrolyte composition and a first monomer according to formula (I)

(I)

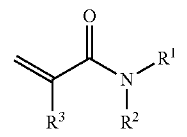

wherein
$R^1$ represents a first substituent having from 1 to 8 carbon atoms and optionally comprising at least one functional group selected from alcohols, amines, ethers, ketones, amides, acetals, ketals, aminoacetals, hemiaminal ethers or combinations thereof;
and
wherein $R^2$ represents H or a second substituent having from 1 to 8 carbon atoms and comprising at least one functional group selected from alcohols, amines, ethers, ketones, amides, acetals, ketals, aminoacetals, hemiaminal ethers or combinations thereof;

wherein $R^3$ is selected from H, methyl or ethyl; and wherein n is an integer from 1 to 5, and wherein the first monomer is according to option A, B or C:

A. R1 is selected from C1-C6 alkyl, and R2 is selected from H or methyl, and R3 is selected from H or methyl; or B. R1 is selected from C1-C6 alkyl, and R2 is selected from selected from C1-C6 alkyl, and R3 is selected from H or methyl; or C. R1 is selected from C1-C6 hydroxyalkyl, wherein the C1-C6 hydroxyalkyl comprises one hydroxyl functional group, R2 is selected from H or methyl, and R3 is selected from H or methyl.

2. The electrochemical cell according to claim 1, wherein the precursor composition further comprises a first crosslinker.

3. The electrochemical cell according to claim 2, wherein the first crosslinker is selected from crosslinkers comprising two or more functional groups selected from the group consisting of allyl ($—CH_3—CH═CH_2$), oxiranyl ($—C_2H_3O$), glycidyl ($—CH_2—C_2H_3O$), vinyl ether ($—O—CH═CH_2$), vinyl ester ($—C(O)—O—CH═CH_2$), vinyl amide ($—C(O)—NH—CH═CH_2$), vinyl amine ($—NH—CH═CH_2$), norbornene, maleate, fumarate, itaconate, alkynyl ($—C≡CH$), styrene ($-Ph-CH═CH_2$), acrylamide ($—NH—C(O)—CH═CH_2$), methacrylamide ($—NH—C(O)—C(CH_3)═CH_2$), acrylate ($—O—C(O)—CH═CH_2$), methacrylate ($—O—C(O)—C(CH_3)═CH_2$) and combinations thereof.

4. The electrochemical cell according to claim 2, wherein the first crosslinker is comprised in the precursor composition in an amount such that the molar ratio of the total amount of the first monomer comprised in the precursor composition to the total amount of the first crosslinker comprised in the precursor composition is within the range of 99.5:0.5 to 80:20.

5. The electrochemical cell according to claim 1, wherein the deep eutectic solvent (DES) has a eutectic point of less than or equal to 25° C.

6. The electrochemical cell according to claim 1, wherein the deep eutectic solvent (DES) comprises at least one hydrogen bond acceptor and at least one hydrogen bond donor, wherein the at least one hydrogen bond acceptor comprises a lithium salt, a zinc salt or a combination thereof.

7. The electrochemical cell according to claim 6, wherein the at least one hydrogen bond acceptor is selected from the group consisting of lithium bis(trifluoromethanesulfonyl) imide (LiTFSI), lithium trifluoromethanesulfonate (LiOTf), lithium chloride (LiCl), lithium hexafluorophosphate ($LiPF_6$), lithium polysulfide, lithium perchlorate ($LiClO_4$), lithium bromide (LiBr), lithium iodide (LiI), lithium thiocyanate (LiSCN), lithium tetrafluoroborate ($LiBF_4$), lithium hexafluoroarsenate ($LiAsF_6$), lithium bis(oxalate) borate (LiBOB), lithium fluoroalkylphosphate (LFAP [$LiPF_3(CF_2CF_3)_3$]), and combinations thereof.

8. The electrochemical cell according to claim 6, wherein the at least one hydrogen bond donor is selected from the group consisting of urea, N-methylurea, N,N-dimethylurea, N,N'-dimethylurea, N,N,N'-trimethylurea, thiourea, N-methylthiourea, N,N-dimethylthiourea, N,N'-dimethylthiourea, N,N,N'-trimethylthiourea, ethylene glycol, propane-1,2-diol, propane-1,3-diol, butane-1,4-diol, 1,2,3-propanetriol, acetic acid, oxalic acid, malonic acid, succinic acid, glutaric acid, adipic acid, pimelic acid, suberic acid, azelaic acid, sebacic acid, undecanedioic acid, dodecanedioic acid, benzoic acid, glycolic acid, citric acid, 2-hydroxy propionic acid, 2-hydroxy isobutyric acid, o-phenylenediamine, choline chloride, acetamide, N-methylacetamide, trifluoroacetamide, N-methyl trifluoroacetamide, benzamide, benzenesulphonic acid, p-toluenesulphonic acid, o-toluenesulphonic acid, m-toluenesulphonic acid, and combinations thereof.

9. The electrochemical cell according to claim 1, wherein $R^1$ and $R^2$ are the same, and wherein $R^3$ is selected from H or methyl; or $R^1$ is a $C_3$ alkyl, and $R^2$ is selected from H or methyl, and $R^3$ is selected from H or methyl.

10. The electrochemical cell according to claim 1, wherein the polymer electrolyte is coated on and/or at least partially embedded in the cathode active material.

11. The electrochemical cell according to claim 1, wherein M comprises:

Ni in a content x, wherein 50.0 mol %≤x≤85.0 mol %,

Mn in a content y, wherein 7.5 mol %≤y≤25.0 mol %,

Co in a content z, wherein 7.5 mol %≤z≤25.0 mol %,

D in a content a, wherein 0.0 mol %≤a≤2.0 mol %, wherein D is at least one element other than Li, Ni, Mn, Co, and O, wherein x+y+z+a is 100.0 mol %.

12. A method for the production of an electrochemical cell according to claim 1, comprising the following steps:

(a) providing a cathode comprising cathode active material as described in claim 1, (b) providing an anode, (c) providing an electrolyte, (d) forming the electrochemical cell by assembling the cathode, the anode, and the polymer electrolyte into an electrochemical cell, wherein the electrolyte comprises the polymer electrolyte as described in claim 1, and/or wherein the cathode is provided in the form of a composite cathode comprising the cathode active material and the polymer electrolyte as described in claim 1.

13. The electrochemical cell of claim 1, wherein the deep eutectic solvent consists of lithium bis(trifluoromethanesulfonyl) imide (LiTFSI) and N-methylacetamide at a molar HBA:HBD ratio of 1:3.5-1:4.5.

14. The electrochemical cell of claim 1, wherein the precursor composition comprises 83-87 vol % of the deep eutectic solvent.

15. The electrochemical cell of claim 1, wherein the monomer:crosslinker molar ratio is 98:2-85:15.

16. The electrochemical cell of claim 1, wherein ≥99 wt % of the precursor consists of the electrolyte composition, the first monomer, the first crosslinker, and one or more radical initiators.

* * * * *